(12) United States Patent
Zatz et al.

(10) Patent No.: US 6,724,394 B1
(45) Date of Patent: Apr. 20, 2004

(54) PROGRAMMABLE PIXEL SHADING ARCHITECTURE

(75) Inventors: Harold Robert Feldman Zatz, Mountain View, CA (US); Henry P. Moreton, Woodside, CA (US); John Erik Lindholm, Cupertino, CA (US)

(73) Assignee: NVIDIA Corporation, Santa Clara, CA (US)

( * ) Notice: Subject to any disclaimer, the term of this patent is extended or adjusted under 35 U.S.C. 154(b) by 340 days.

(21) Appl. No.: 09/885,242

(22) Filed: Jun. 19, 2001

Related U.S. Application Data

(63) Continuation-in-part of application No. 09/585,809, filed on May 31, 2000, now Pat. No. 6,532,013.

(51) Int. Cl.$^7$ .......................... G06T 15/40; G06T 15/50
(52) U.S. Cl. ...................... 345/581; 345/421; 345/426; 345/582
(58) Field of Search ................................ 345/418–421, 345/426, 428, 581, 586, 582, 583, 587, 588, 589, 592, 618–620, 643, 708, 712

(56) References Cited

U.S. PATENT DOCUMENTS

| | | | |
|---|---|---|---|
| 4,615,013 A | | 9/1986 | Yan et al. |
| 4,866,637 A | | 9/1989 | Gonzalez-Lopez et al. |
| 5,517,611 A | * | 5/1996 | Deering ....................... 345/503 |
| 5,613,050 A | * | 3/1997 | Hochmuth et al. .......... 345/422 |
| 5,754,125 A | * | 5/1998 | Pearce ........................ 340/989 |
| 5,821,949 A | * | 10/1998 | Deering ....................... 345/505 |
| 5,852,446 A | | 12/1998 | Hashimoto et al. |
| 5,880,736 A | | 3/1999 | Peercy et al. |
| 6,155,047 A | * | 12/2000 | Streetman .................... 60/398 |
| 6,198,488 B1 | * | 3/2001 | Lindholm et al. ........... 345/426 |
| 6,268,875 B1 | * | 7/2001 | Duluk, Jr. et al. .......... 345/506 |
| 6,285,779 B1 | * | 9/2001 | Lapidous et al. ........... 382/106 |
| 6,333,744 B1 | * | 12/2001 | Kirk et al. ................... 345/506 |
| 6,453,065 B1 | * | 9/2002 | Lapidous et al. ........... 382/154 |
| 6,466,222 B1 | | 10/2002 | Kao et al. |
| 6,476,807 B1 | * | 11/2002 | Duluk, Jr. et al. .......... 345/421 |

* cited by examiner

*Primary Examiner*—Wesner Sajous
(74) *Attorney, Agent, or Firm*—Cooley Godward LLP

(57) ABSTRACT

A system and associated method are provided for processing pixel data in a graphics pipeline. Included is a triangle module coupled to a rasterizer for calculating a plurality of equations using pixel data received from the rasterizer. Also provided is a shader core module coupled to the rasterizer for receiving the pixel data therefrom. The shader core module is further coupled to the triangle module for receiving the equations therefrom. The shader core module functions to execute floating point calculations and generating texture coordinates using the pixel data. Coupled to the shader core module is a texture module. The texture module is capable of looking up texture values using the texture coordinates. Associated therewith is a shader back end module coupled to the texture module and the triangle module. The shader back end module is capable of converting the texture values to an appropriate floating point representation and generating color values using the equations. Still yet, a combiner module is coupled to the shader core module and the shader back end module. Such combiner module combines the color values and the texture values.

17 Claims, 13 Drawing Sheets

| OPCODE | INPUT(scalar or vector) | OUTPUT(scalar or vector) |
|---|---|---|
| NOP | | |
| TEX, TXP | v | v |
| TXD | v, v, v | v |
| DDX, DDY | v | v |
| MOV | v | v |
| MUL | v, v | v |
| ADD | v, v | v |
| MAD | v, v, v | v |
| RCP | s | ssss |
| RSQ | s | ssss |
| DP3 | v, v | ssss |
| DP4 | v, v | ssss |
| DST | v, v | v |
| MIN, MAX | v, v | v |
| PK2, PK4 | v | s |
| UP2, UP4 | s | v |
| SLT, SGE | v, v | v |
| FRC, FLR | v | v |
| KIL | RC | |
| EXP | s | v |
| LOG | s | v |
| LIT | v | v |

| Opcode | mux 1 out | mux 2 out | mux 3 out | mux 4 out |
|---|---|---|---|---|
| nop | | | | |
| mov t, s | s | s | s | s |
| add t, s0, s1 | s0, s1 | s0, s1 | s0, s1 | s0.x + s1.x<br>s0.y + s1.y<br>s0.z + s1.z<br>s0.w + s1.w |
| mad t, s0, s1, s2 | s0, s1, s2 | s0, s1, s2 | s0.x * s1.x<br>s0.y * s1.y<br>s0.z * s1.z<br>s0.w * s1.w<br>s2 | mul.x + s2.x<br>mul.y + s2.y<br>mul.z + s2.z<br>mul.w + s2.w |
| mul t, s0, s1 | s0, s1 | s0, s1 | s0.x * s1.x<br>s0.y * s1.y<br>s0.z * s1.z<br>s0.w * s1.w | mul.x<br>mul.y<br>mul.z<br>mul.w |
| rcp t, s.x | s.x | rcpa(s.x) | rcpa | rcpa |
| rsq16 t, s.x | s.x | rsq16(s.x) | rsq16 | rsq16 |
| rsq32 t, s.x | s.x | rsq16(s.x) | rsq16*1.5<br>rsq16*rsq16<br>rsq16*s.x | rsq16*1.5<br>rsq16*rsq16<br>rsq16*s.x*.5 |
| | scratch.x (3/2 u)<br>scratch.y (u^2)<br>scratch.z (1/2 uv) | scratch.x<br>scratch.y<br>scratch.z | scratch.x<br>scratch.y*scratch.z | scratch.x - mul.y<br>(1.5u - .5vu^3) |
| dp3 t, s0, s1 | s0, s1 | s0,s1 | s0.x * s1.x<br>s0.y * s1.y<br>s0.z * s1.z | mul.x + mul.y + mul.z |
| dp4 t, s0, s1 | s0, s1 | s0, s1 | s0.x * s1.x<br>s0.y * s1.y<br>s0.z * s1.z<br>s0.w * s1.w | mul.x + mul.y + mul.z + mul.w |
| min t, s0, s1 | s0, s1 | s0, s1 | s0, s1 | minimum |
| max t, s0, s1 | s0, s1 | s0, s1 | s0, s1 | maximum |
| slt t, s0, s1 | s0, s1 | s0, s1 | s0, s1 | 0 or 1 |
| sge t, s0, s1 | s0, s1 | s0, s1 | s0, s1 | 0 or 1 |
| exp t, s.x | s.x | s.x | -na- | exp( s.x ) |
| log t, s.x | s.x | s.x | -na- | log( s.x ) |
| frc t, s | s | s | s | fraction( s ) |
| lit t, s | s | s | -na- | lit( s ) |
| dst t, s0, s1 | s0.y<br>s0.z<br>s1.y<br>s1.w | s0.y<br>s0.z<br>s1.y<br>s1.w | s0.y * s1.y | 1.0<br>mul.y<br>s0.z<br>s1.w |
| lrp t, s0, s1, s2 | s1, s2 | s1, s2 | s1, s2 | s1.x - s2.x<br>s1.y - s2.y<br>s1.z - s2.z<br>s1.w - s2.w |
| | s0, s2, scratch | s0, s2, scratch | s0.x * scratch.x<br>s0.y * scratch.y | mul.x + s2.x<br>mul.y + s2.y |

Figure 9A

|  |  |  | s0.z * scratch.z<br>s0.w * scratch.w | mul.z + s2.z<br>mul.w + s2.w |
|---|---|---|---|---|
| texcoord t | sss( t.x )<br>sst( t.y )<br>ssr( t.z )<br>ssq( t.w )<br>ssa( 1/w ) | sss<br>sst<br>ssr<br>ssq<br>rcpa( ssa ) | sss * rcpa<br>sst * rcpa<br>ssr * rcpa<br>ssq * rcpa | mul.x<br>mul.y<br>mul.z<br>mul.w |
| texkill t | sss( t.x )<br>sst( t.y )<br>ssr( t.z )<br>ssq( t.w )<br>ssa( 1/w ) | sss<br>sst<br>ssr<br>ssq<br>rcpa( ssa ) | sss * rcpa<br>sst * rcpa<br>ssr * rcpa<br>ssq * rcpa | mul.x<br>mul.y<br>mul.z<br>mul.w |
| 2d even texture s | sss( s.x )<br>sst( s.y )<br>ssa( s.w ) | sss<br>sst<br>rcpa( ssa ) | sss * rcpa<br>sst * rcpa | mul.x<br>mul.y |
| 2d odd texture s | ssr( s.x )<br>ssq( s.y )<br>ssb( s.w ) | ssr<br>ssq<br>rcpb( ssb ) | ssr * rcpb<br>sst * rcpb | mul.z<br>mul.w |
| cube even texture s | cube0[<br>  sss( s.x )<br>  sst( s.y )<br>  ssa( s.z )<br>] | cube0.x<br>cube0.y<br>rcpa( cube0.z )<br>cube0.side | cube0.x * rcpa<br>cube0.y * rcpa<br>cube0.side | mul.x<br>mul.y<br>cube0.side |
| cube odd texture s | cube1[<br>  ssr( s.x )<br>  ssq( s.y )<br>  ssb( s.z )<br>] | cube1.x<br>cube1.y<br>rcpb( cube1.z )<br>cube1.side | cube1.x * rcpb<br>cube1.y * rcpb<br>cube1.side | mul.z<br>mul.w<br>cube1.side |
| 3d texture s | sss( s.x )<br>sst( s.y )<br>ssr( s.z )<br>ssq( s.w ) | sss<br>sst<br>ssr<br>rcpa( ssq ) | sss * rcpa<br>sst * rcpa<br>ssq * rcpa | mul.x<br>mul.y<br>mul.z |
| texbem t, s | sss( t.x )<br>sst( t.y )<br>ssa( 1/w ) | sss<br>sst<br>rcpa( ssa ) | sss * rcpa<br>sst * rcpa | mul.x<br>mul.y |
|  | scratch.x<br>scratch.y<br>s.x<br>s.y<br>s.z | scratch.x<br>scratch.y<br>s.x<br>s.y<br>s.z | s.x * M0<br>s.x * M1<br>s.y * M2<br>s.y * M3 | scratch.x + mul.x + mul.y<br>scratch.y + mul.z + mul.w |
| texbeml t, s | sss( t.x )<br>sst( t.y )<br>ssa( 1/w )<br>s.z | sss<br>sst<br>rcpa( ssa )<br>s.z | sss * rcpa<br>sst * rcpa<br>s.z * scale | mul.x<br>mul.y<br>bias + mul.w (lum) |
|  | scratch.x<br>scratch.y<br>s.x<br>s.y<br>s.z | scratch.x<br>scratch.y<br>s.x<br>s.y<br>s.z | s.x * M0<br>s.x * M1<br>s.y * M2<br>s.y * M3 | scratch.x + mul.x + mul.y<br>scratch.y + mul.z + mul.w<br>scratch.w (lum) |
|  | scratch.x (red)<br>scratch.y (green)<br>scratch.z (blue)<br>scratch.w (lum) | scratch.x<br>scratch.y<br>scratch.z<br>scratch.w | scratch.x * scratch.w<br>scratch.y * scratch.w<br>scratch.z * scratch.w | mul.x<br>mul.y<br>mul.z |

Figure 9B

| | | | | |
|---|---|---|---|---|
| texbemproj t, s | sss( t.x )<br>sst( t.y )<br>ssa( t.w ) | sss<br>sst<br>rcpa( ssa ) | sss * rcpa<br>sst * rcpa | mul.x<br>mul.y |
| | scratch.x<br>scratch.y<br>s.x<br>s.y<br>s.z | scratch.x<br>scratch.y<br>s.x<br>s.y<br>s.z | s.x * M0<br>s.x * M1<br>s.y * M2<br>s.y * M3 | scratch.x + mul.x + mul.y<br>scratch.y + mul.z + mul.w |
| texreg2ar t, s | s.x<br>s.y | s.x<br>s.y | s.x<br>s.y | s.x<br>s.y |
| texreg2gb t, s | s.x<br>s.y | s.x<br>s.y | s.x<br>s.y | s.x<br>s.y |
| texm3x2pad t, s | sss( t.x )<br>sst( t.y )<br>ssr( t.z )<br>s.x<br>s.y<br>s.z | sss<br>sst<br>ssr<br>s.x<br>s.y<br>s.z | sss * s.x<br>sst * s.y<br>ssr * s.z | mul.x + mul.y + mul.z |
| texm3x2tex t, s | sss( t.x )<br>sst( t.y )<br>ssr( t.z )<br>s.x<br>s.y<br>s.z | sss<br>sst<br>ssr<br>s.x<br>s.y<br>s.z | sss * s.x<br>sst * s.y<br>ssr * s.z | scratch.x<br>mul.x + mul.y + mul.z |
| | ssa( 1/w )<br>scratch.x<br>scratch.y | rcpa( ssa )<br>scratch.x<br>scratch.y | scratch.x * ssa<br>scratch.y * ssa | mul.x<br>mul.y |
| texm3x2depth t, s | sss( t.x )<br>sst( t.y )<br>ssr( t.z )<br>s.x<br>s.y<br>s.z | sss<br>sst<br>ssr<br>s.x<br>s.y<br>s.z | sss * s.x<br>sst * s.y<br>ssr * s.z | scratch.x<br>mul.x + mul.y + mul.z |
| | scratch.x<br>scratch.y | rcpa( scratch.y )<br>scratch.x | scratch.x * rcpa | mul.x |
| texm3x3pad t, s | sss( t.x )<br>sst( t.y )<br>ssr( t.z )<br>s.x<br>s.y<br>s.z | sss<br>sst<br>ssr<br>s.x<br>s.y<br>s.z | sss * s.x<br>sst * s.y<br>ssr * s.z | mul.x + mul.y + mul.z<br>(first to scratch.x;<br> second to scratch.y) |
| texm3x3tex t, s | sss( t.x )<br>sst( t.y )<br>ssr( t.z )<br>s.x<br>s.y<br>s.z | sss<br>sst<br>ssr<br>s.x<br>s.y<br>s.z | sss * s.x<br>sst * s.y<br>ssr * s.z | scratch.x<br>scratch.y<br>mul.x + mul.y + mul.z |
| | ssa( 1/w )<br>scratch.x<br>scratch.y<br>scratch.z | rcpa( ssa )<br>scratch.x<br>scratch.y<br>scratch.z | scratch.x * ssa<br>scratch.y * ssa<br>scratch.z * ssa | mul.x<br>mul.y<br>mul.z |
| texm3x3cube t, s | sss( t.x )<br>sst( t.y ) | sss<br>sst | sss * s.x<br>sst * s.y | scratch.x<br>scratch.y |

Figure 9C

|  | ssr( t.z )<br>s.x<br>s.y<br>s.z | ssr<br>s.x<br>s.y<br>s.z | ssr * s.z | mul.x + mul.y + mul.z |
|---|---|---|---|---|
|  | cube0[<br>  scratch.x<br>  scratch.y<br>  scratch.z<br>] | cube0.x<br>cube0.y<br>rcpa( cube0.z )<br>cube0.side | cube0.x * rcpa<br>cube0.y * rcpa<br>cube0.side | mul.x<br>mul.y<br>cube0.side |
| texreg2rgb t, s | s.x<br>s.y<br>s.z | s.x<br>s.y<br>s.z | s.x<br>s.y<br>s.z | s.x<br>s.y<br>s.z |
| texreg2rgbcube t, s | cube0[<br>  s.x<br>  s.y<br>  s.z<br>] | cube0.x<br>cube0.y<br>rcpa( cube0.z )<br>cube0.side | cube0.x * rcpa<br>cube0.y * rcpa<br>cube0.side | mul.x<br>mul.y<br>cube0.side |
| texdp3 t, s | sss( t.x )<br>sst( t.y )<br>ssr( t.z )<br>s.x<br>s.y<br>s.z | sss<br>sst<br>ssr<br>s.x<br>s.y<br>s.z | sss * s.x<br>sst * s.y<br>ssr * s.z | mul.x + mul.y + mul.z |
|  | scratch.x<br>ssa( 1/w ) | scratch.x<br>rcpa( ssa ) | scratch.x * ssa | mul.x |
| texdp3tex t, s | sss( t.x )<br>sst( t.y )<br>ssr( t.z )<br>s.x<br>s.y<br>s.z | sss<br>sst<br>ssr<br>s.x<br>s.y<br>s.z | sss * s.x<br>sst * s.y<br>ssr * s.z | mul.x + mul.y + mul.z |
|  | scratch.x<br>ssa( 1/w ) | scratch.x<br>rcpa( ssa ) | scratch.x * ssa | mul.x |
| texdp3depth t, s | sss( t.x )<br>sst( t.y )<br>ssr( t.z )<br>s.x<br>s.y<br>s.z | sss<br>sst<br>ssr<br>s.x<br>s.y<br>s.z | sss * s.x<br>sst * s.y<br>ssr * s.z | mul.x + mul.y + mul.z |
|  | scratch.x<br>ssa( 1/w ) | scratch.x<br>rcpa( ssa ) | scratch.x * ssa | mul.x |
| texbrdf t, s0, s1 | s0.x<br>s0.y<br>s1.x<br>s1.y | s0.x<br>s0.y<br>s1.x<br>s1.y | s0.x<br>s0.y<br>s1.x<br>s1.y | s0.x<br>s1.x<br>s0.y - s1.y |
| texm3x3spec t, s0, s1 | sss( t.x )<br>sst( t.y )<br>ssr( t.z )<br>s0.x<br>s0.y<br>s0.z | sss<br>sst<br>ssr<br>s0.x<br>s0.y<br>s0.z | sss * s.x<br>sst * s.y<br>ssr * s.z | scratch.x (-> r0.y)<br>scratch.y (-> r0.z)<br>mul.x + mul.y + mul.z (->r0.w)<br>(c0, n/w.x, n/w.y, n/w.z) |
|  | r0.y<br>r0.z | r0.y<br>r0.z | r0.y * ssa<br>r0.z * ssa | mul.x (-> r0.y)<br>mul.y (-> r0.z) |

Figure 9D

|  | r0.w<br>ssa( 1/w ) | r0.w<br>rcpa( ssa ) | r0.w * ssa | mul.z (-> r0.w)<br>(c0, n.x,n.y,n.z) |
|---|---|---|---|---|
|  | r0.y<br>r0.z<br>r0.w | r0.y<br>r0.z<br>r0.w | r0.y * r0.y<br>r0.z * r0.z<br>r0.w * r0.w |  |
|  |  |  |  | mul.x + mul.y + mul.z<br>(-,-,-, n*n) |
|  | sss( s1.x )<br>sst( s1.y )<br>ssr( s1.z )<br>scratch.w | sss<br>sst<br>ssr<br>scratch.w | 2 * sss * r0.y<br>2 * sst * r0.z<br>2 * ssr * r0.w | mul.x + mul.y + mul.z<br>scratch.w<br>(-,-, 2e.n/w,n*n) |
|  | scratch.z<br>scratch.w | scratch.z<br>rcpa( scratch.w<br>) | scratch.z * rcpa | mul.w<br>(-,-,-, 2e.n/(nnw))) |
|  | scratch.w<br>sss( s1.x )<br>sst( s1.y )<br>ssr( s1.z )<br>r0.y<br>r0.z<br>r0.w | scratch.w<br>sss<br>sst<br>ssr<br>r0.y<br>r0.z<br>r0.w | scratch.w * r0.y<br>scratch.w * r0.z<br>scratch.w * r0.w<br>sss<br>sst<br>ssr | mul.x - sss<br>mul.y - sst<br>mul.z - ssr<br>( 2(e.n)nx/(nnw) - ex/w, ...) |
|  | cube0[<br>  r0.y<br>  r0.z<br>  r0.w<br>]<br>cube1[<br>  scratch.x<br>  scratch.y<br>  scratch.z<br>] | cube0.x<br>cube0.y<br>rcpa(cube0.z)<br>cube0.side<br>cube1.x<br>cube1.y<br>rcpb(cube1.z)<br>cube1.side | cube0.x * rcpa<br>cube0.y * rcpa<br>cube0.side<br>cube1.x * rcpb<br>cube1.y * rcpb<br>cube1.side | mul.x<br>mul.y<br>cube0.side<br>mul.z<br>mul.w<br>cube1.side |

Figure 9E

PROGRAMMABLE PIXEL SHADING ARCHITECTURE

RELATED APPLICATION(S)

This application is a continuation-in-part of an application entitled "SYSTEM, METHOD AND ARTICLE OF MANUFACTURE FOR PIXEL SHADERS FOR PROGRAMMABLE SHADING" filed May 31, 2000 under Ser. No. 09/585,809, U.S. Pat. No. 6,532,013 and which is incorporated herein by reference in its entirety.

FIELD OF THE INVENTION

The present invention relates to computer graphics, and more particularly to pixel shading in a computer graphics processing pipeline.

BACKGROUND OF THE INVENTION

Recent advances in computer performance have enabled graphic systems to provide more realistic graphical images using personal computers and home video game computers. In such graphic systems, some procedure must be implemented to "render" or draw graphic primitives to the screen of the system. A "graphic primitive" is a basic component of a graphic picture, such as a polygon, e.g., a triangle, or a vector. All graphic pictures are formed with combinations of these graphic primitives. Many procedures may be utilized to perform graphic primitive rendering.

Early graphic systems displayed images representing objects having extremely smooth surfaces. That is, textures, bumps, scratches, or other surface features were not modeled. In order to improve the quality of the image, texture mapping was developed to model the complexity of real world surface images. In general, texture mapping is the mapping of an image or a function onto a surface in three dimensions. Texture mapping is a relatively efficient technique for creating the appearance of a complex image without the tedium and the high computational cost of rendering the actual three dimensional detail that might be found on a surface of an object.

Prior Art FIG. 1 illustrates a graphics pipeline with which texture mapping may be performed. As shown, included is a transform engine 100, a set-up module 102, a rasterizer 104, a texture math module 106, a level of detail (LOD) calculator 108, a texture fetch module 110, a texture filter 112 and a texture combination engine 114. It should be noted that the transform engine 100 and set-up module 102 need not necessarily be required in the graphics pipeline of a graphics integrated circuit.

During operation, the transform engine 100 may be used to perform scaling, rotation, and projection of a set of three dimensional vertices from their local or model coordinates to the two dimensional window that will be used to display the rendered object. The setup module 102 utilizes the world space coordinates provided for each triangle to determine the two dimensional coordinates at which those vertices are to appear on the two dimensional window. Prior Art FIG. 2 illustrates the coordinates 200 of the vertices 201 which define a triangle 202. If the vertices 201 of the triangle 202 are known in screen space, the pixel positions vary along scan lines within the triangle 202 in screen space and may be determined.

The setup module 102 and the rasterizer module 104 together use the three dimensional world coordinates to determine the position of each pixel contained inside each of the triangles. Prior Art FIG. 2A illustrates a plurality of pixels 298 identified within the triangle 202 in such a manner. The color values of the pixels in the triangle 202 vary from pixel to pixel in world space. During use, the setup module 102 and the rasterizer module 104 generate interpolated colors, depth and texture coordinates.

The setup module 102 and the rasterizer module 104 then feed the pixel texture coordinates to the texture math module 106 to determine the appropriate texture map colors. In particular, texture coordinates are generated that reference a texture map using texture coordinate interpolation which is commonly known to those of ordinary skill in the art. This is done for each of the pixels 298 identified in the triangle 202. Prior Art FIG. 2A illustrates texture coordinates 299 for the pixels 298 identified within the triangle 202.

Next, a LOD calculation is performed by the LOD calculator 108. Occasionally during rendering, one texel, or texture element, will correspond directly to a single pixel that is displayed on a monitor. In this situation the level of detail (LOD) is defined to be equal to zero (0) and the texel is neither magnified nor minified. However, the displayed image can be a magnified or minified representation of the texture map. If the texture map is magnified, multiple pixels will represent a single texel. A magnified texture map corresponds to a negative LOD value. If the texture map is minified, a single pixel represents multiple texels. A minified texture map corresponds to a positive LOD value. In general, the LOD value corresponds to the number of texels in the texture map 'covered' by a single pixel.

The amount of detail stored in different LOD representations may be appreciated by drawing an analogy to the detail perceived by an observer while observing a texture map. For example, very little detail may be perceived by an observer while watching an automobile from a distance. On the other hand, several details such as doors, windows, mirrors will be perceived if the observer is sufficiently close to the automobile. A finer level LOD will include such additional details, and a courser LOD will not.

Once the appropriate level of detail of the texture map is selected based on the calculated LOD value, the texture coordinates generated by the texture math module 106 are used to fetch the appropriate texture map colors using the texture fetch module 110. These texture map colors are then filtered by the texture filter module 112. The combiner engine 114 combines together the various colors and textures fetched by the texture fetch module 110 and filtered by the texture filter module 112.

It is important to note that the pipeline described hereinabove has a linear topology. These and other simplistic non-linear pipelines only enable one texture fetch and texture calculation per rendering pass. This is a limited design that is static in nature. There is thus a need for a pipeline that allows for more dynamic texture fetches and shading calculations, and in particular, the ability for feeding filter results back to influence subsequent texture address calculations.

DISCLOSURE OF THE INVENTION

A system and associated method are provided for processing pixel data in a graphics pipeline. Included is a triangle module coupled to a rasterizer for calculating a plurality of equations using pixel data received from the rasterizer. Also provided is a shader core module coupled to the rasterizer for receiving the pixel data therefrom. The shader core module is further coupled to the triangle module for receiving the equations therefrom. The shader core module functions to execute floating point calculations and generating texture coordinates using the pixel data. Coupled to the shader core module is a texture module. The texture module is capable of looking up texture values using the texture coordinates. Associated therewith is a shader back end module coupled to the texture module and the triangle module. The shader back end module is capable of converting the texture values to an appropriate floating point representation and generating additional interpolated color values using the equations. Still yet, a combiner module is coupled to the shader core module and the shader back end module. Such combiner module combines the color values and the texture values.

In one embodiment of the present invention, a buffer may be coupled between the triangle module and the shader core module for temporarily storing an output of the triangle module for use by the shader core module. Yet another buffer may be coupled between the triangle module and the shader back end module for temporarily storing the equations for use by the shader back end module. Still another buffer may be coupled between the shader core module and the shader back end module for temporarily storing an output of the floating point calculations for use by the shader back end module. As an option, another buffer may be coupled between the shader back end module and the combiner module for temporarily storing an output of the combiner module for use by the shader back end module in a subsequent loopback pass. Further, the shader core module and the combiner module are coupled via a loopback path for allowing the shader core module to utilize an output of the combiner module.

In another embodiment of the present invention, a plurality of precisions may be supported. In particular, such precisions may include full floating point, half precision floating point and integer. Moreover, the triangle module, shader core module and/or shader back end module may include a plurality of sum-of-products modules.

As an option, the floating point calculations performed by the shader core module may include a no operation, texture fetch, derivative, move, multiply, addition, multiply and addition, reciprocal, reciprocal square root, three component dot product, four component dot product, distance vector, minimum, maximum, pack, unpack, set on less than, set on greater or equal than, floor, fraction, kill pixel, exponential base two (2), logarithm base two (2), and/or light coefficients.

In use, the present invention may optionally be equipped for interweaving shading calculations and texture retrieval operations. In particular, a shading calculation may be performed in order to generate output, i.e. colors or texture coordinates. Next, texture information may be retrieved, and another shading calculation may be performed using the texture information in order to generate additional output. Texture information may be retrieved and shading calculations may then be repeated as desired. Thereafter, the generated output may be combined. As such, the repeated texture information retrieval and shading calculations may be carried out in an iterative, programmable manner.

BRIEF DESCRIPTION OF THE DRAWINGS

The foregoing and other aspects and advantages are better understood from the following detailed description of a preferred embodiment of the invention with reference to the drawings, in which:

Prior Art

Prior Art

Prior Art

FIG. 8 illustrates an instruction set of programmable operations that may be carried out by the shader core module of FIG. 4, in accordance with one embodiment of the present invention; and FIGS. 9A–9E illustrate the manner in which the various operations of FIG. 8 are mapped to the adder module and multiplier modules of the shader core module in order to execute the same.

DESCRIPTION OF THE PREFERRED EMBODIMENTS

Figure 1:
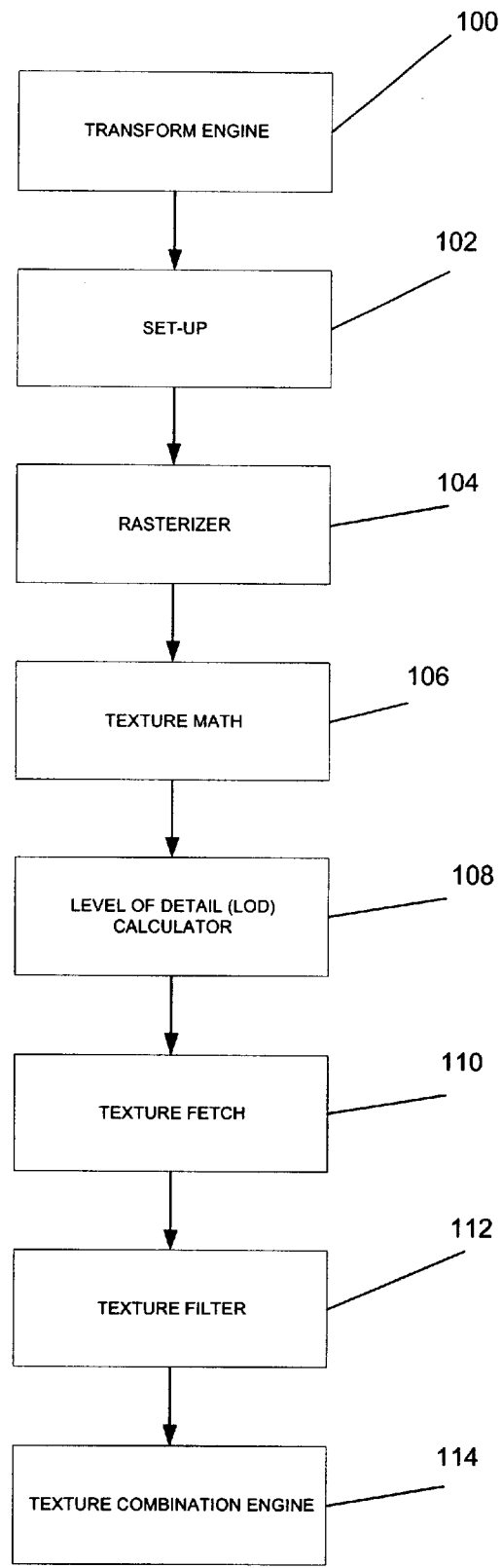
FIG. 1 illustrates a graphics pipeline with which texture mapping may be performed.
Figure 2:
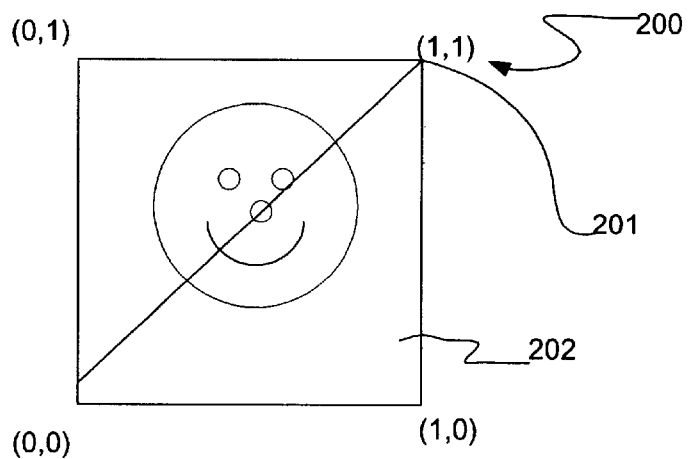
FIG. 2 illustrates the coordinates of the vertices which define a triangle.
Figure 2A:
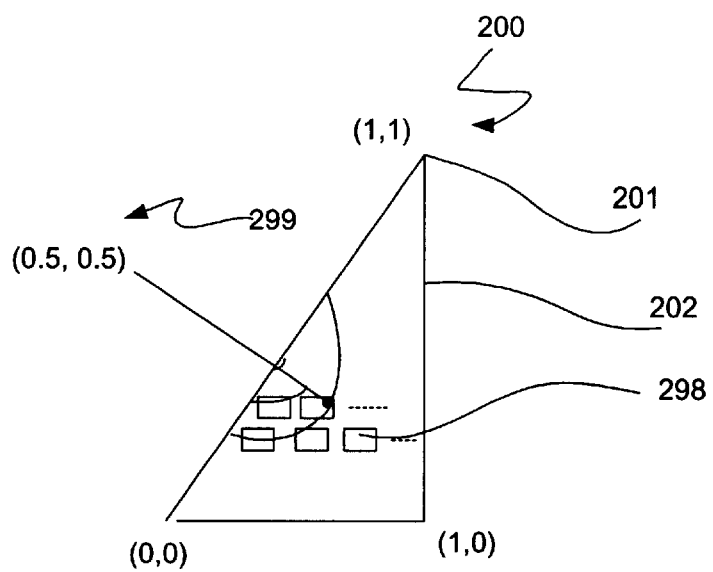
FIG. 2A illustrates a plurality of pixels identified within the triangle of FIG. 2.
Figure 3:
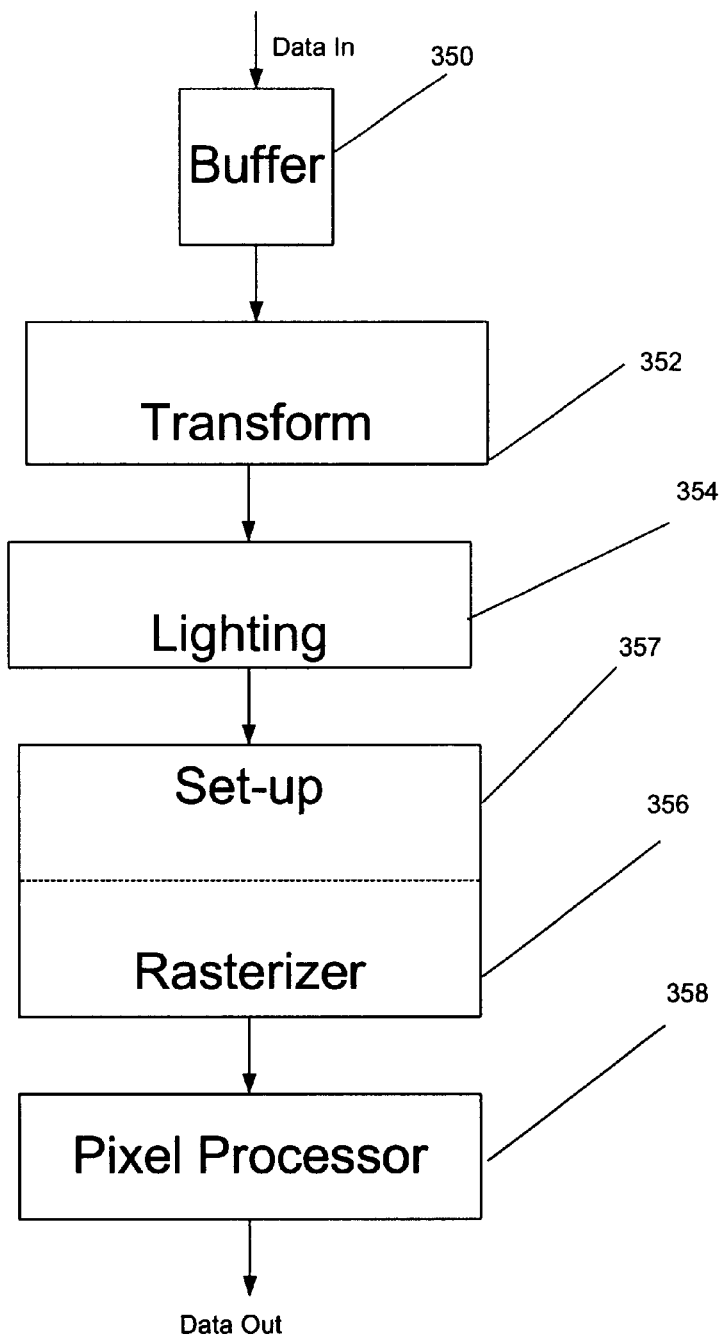
FIG. 3 is a diagram illustrating the various components of one embodiment of the present invention.

FIG. 3 is a schematic diagram illustrating a graphics pipeline in accordance with one embodiment of the present invention. As shown, the present embodiment involves a plurality of modules including an attribute buffer 350, a transform module 352, a lighting module 354, a rasterization module 356 with a set-up module 357, and a pixel processing module 358.

As an option, each of the foregoing modules may be situated on a single semiconductor platform. In the present description, the single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional CPU and bus implementation. Of course, the present invention may also be implemented on multiple semiconductor platforms and/or utilizing a conventional CPU and bus implementation.

During operation, the buffer 350 is included for gathering and maintaining a plurality of attributes. Completed vertices are processed by the transform module 352 and then sent to the lighting module 354. The transform module 352 generates vectors for the lighting module 354 to light. The output of the lighting module 354 is screen space data suitable for the set-up module which, in turn, sets up primitives. Thereafter, rasterization module 356 carries out rasterization of the primitives. In particular, the rasterization module 356 passes on pixel data including, but not limited to a position, a pixel diffuse color, a specular color, a fog distance, a plurality of texture coordinates, and/or any other information relating to the pixels involved with the processing in the graphics pipeline.

A pixel processing module 358 is coupled to the rasterization module 356 for processing the pixel data. The pixel processing module 358 begins by reading the pixel data generated by the rasterization module 356. In operation, the pixel processing module 358 outputs a color and a depth value, i.e. z-value.

Figure 4:
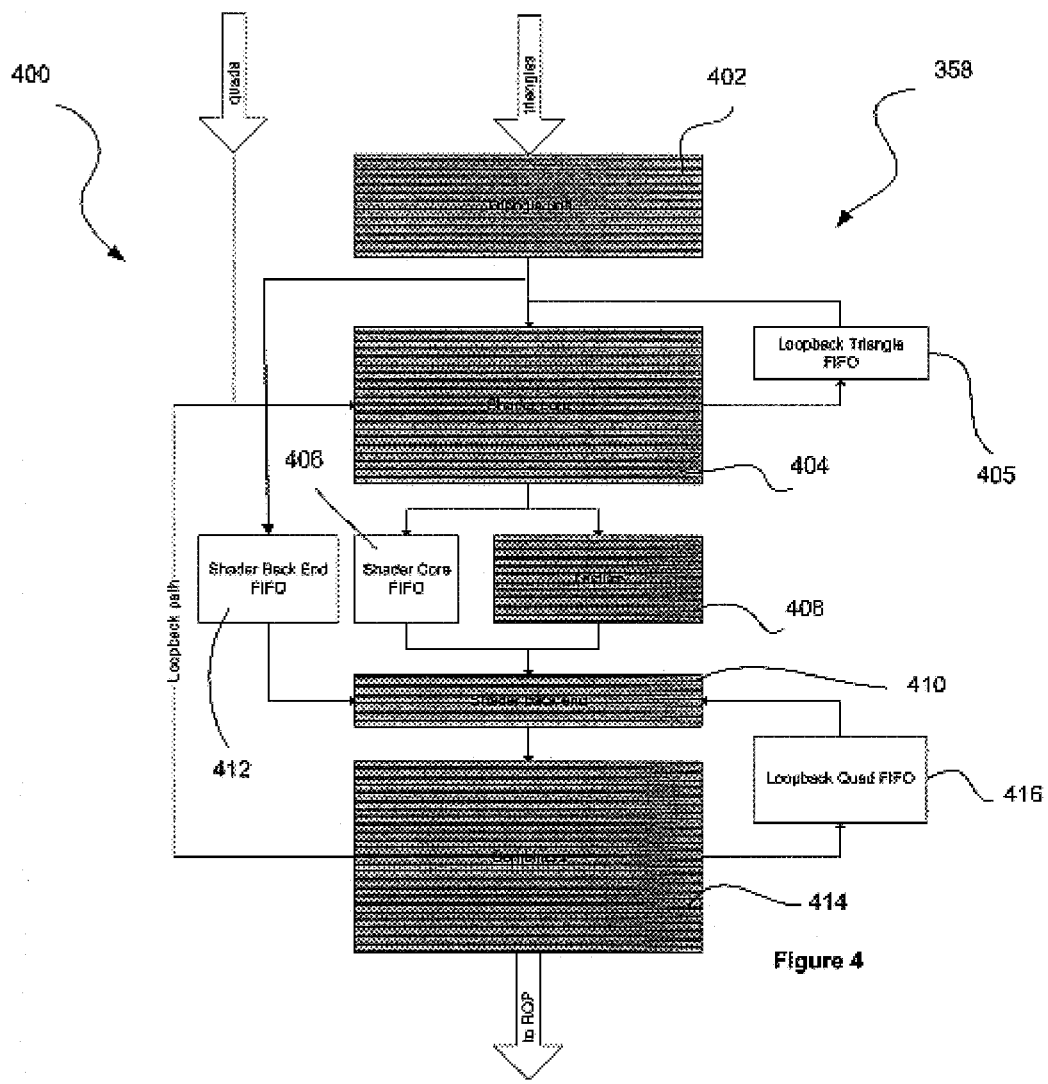
FIG. 4 is a schematic diagram of the various components of the pixel processing module of FIG. 3.

FIG. 4 is a schematic diagram of the various components 400 of the pixel processing module 358 of FIG. 3. Included is a triangle unit 402 coupled to the rasterizer 356 of FIG. 3 for receiving the pixel data therefrom. Ideally, the pixel data is received for each vertex of a polygon, i.e. triangle. It should be noted that the rasterizer 356 also identifies a pixel on the screen that is most likely to be coincident with a polygon, i.e. triangle, being processed.

In use, the triangle unit 402 calculates plane equations at different levels of precision using the pixel data, and further identifies a point of origin of the plane equations. The plane equations are each adapted for describing a value of various pixel data parameters associated with a particular polygon. More information will be set forth regarding an exemplary triangle unit 402 during reference to FIG. 5.

Also provided is a shader core module 404 coupled to the triangle unit 402 and the rasterizer 356 for receiving the plane equations and origin from the triangle unit 402 and the pixel data from the rasterizer 356. In use, the shader core module 404 outputs interpolated values while performing shading operations using the pixel data and the plane equations, executes floating point calculations, and generates texture coordinates. See FIG. 8. More information will be set forth regarding an exemplary shader core module 404 during reference to FIG. 6. A loopback triangle first-in-first-out (FIFO) buffer 405 is coupled between an input and an output of the shader core module 404 for feeding back the interpolated values for further use in the calculations.

Coupled to an output of the shader core module 404 is a shader core FIFO buffer 406 and a texture unit 408. In use, the shader core FIFO buffer 406 stores the output of the floating point calculations generated by the shader core module 404 for later use while the texture coordinates are being processed by the texture unit 408. In operation, the texture unit 408 uses the texture coordinates generated by the shader core module 404 for fetching texture values, and may be configured in any manner well known to those of ordinary skill.

Next included is a shader back end module 410 with an input coupled to an output of the shader core FIFO buffer 406 and the texture unit 408, and a shader back end FIFO 412. The shader back end FIFO 412 is further coupled to an output of the triangle unit 402 for temporarily storing the plane equations for use by the shader back end module 410. In use, the shader back end module 410 serves to convert the texture values to an appropriate floating point representation, and perform color interpolation to generate color values. More information will be set forth regarding an exemplary shader back end module 410 during reference to FIG. 7.

A combiner module 414 is coupled to the shader back end module 410 for receiving the color and texture values and combining the same in any desired proportion. The combiner module 414 may be configured in any manner well known to those of ordinary skill. More information regarding exemplary operation of the combiner module 414 may be found with reference to a co-pending application entitled "IMPROVED GRAPHICS PIPELINE INCLUDING COMBINER STAGES" filed Mar. 20, 1999 naming David B. Kirk, Matthew Papakipos, Shaun Ho, Walter Donovan, and Curtis Priem as inventors, and which is incorporated herein by reference in its entirety.

Exemplary Embodiment

Figure 5:
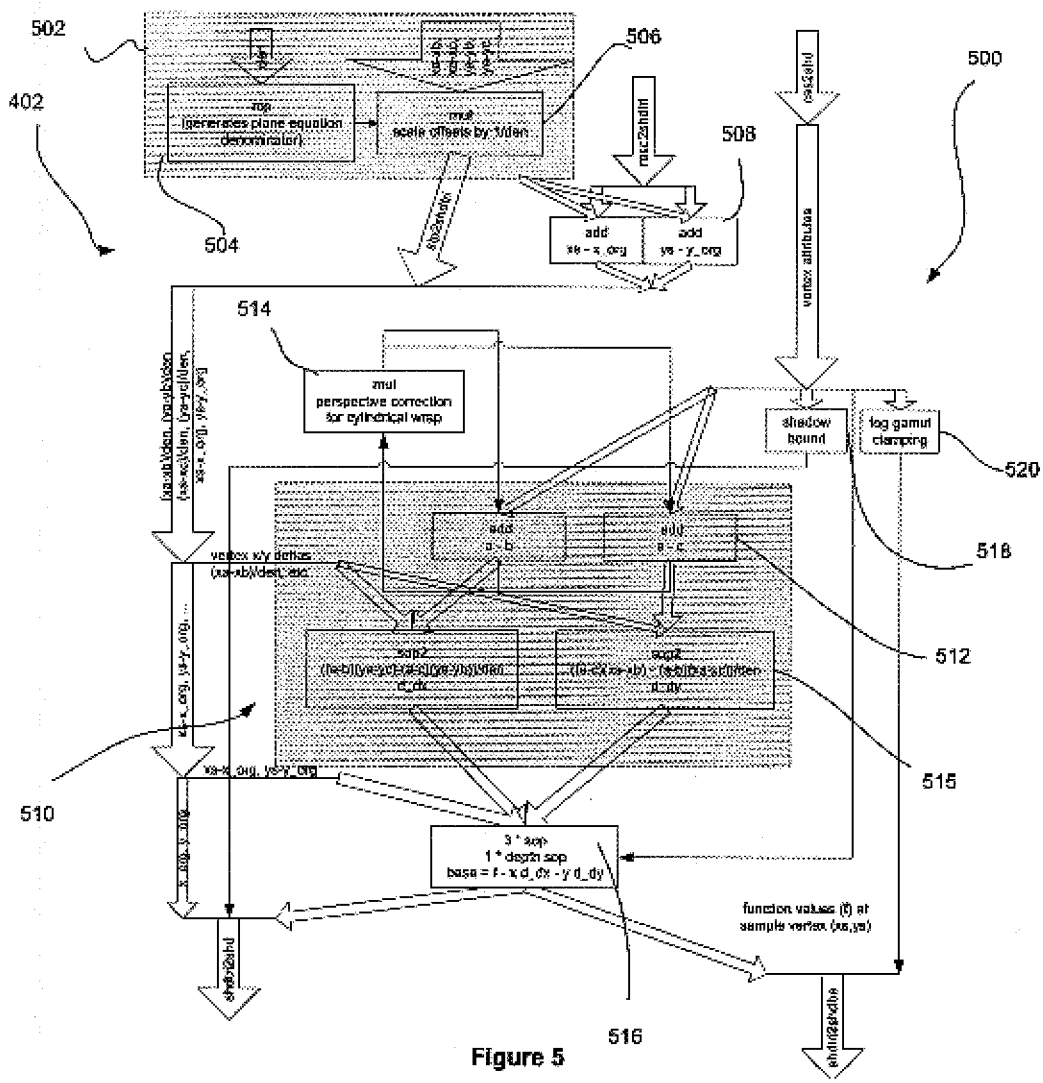
FIG. 5 is a schematic diagram of an exemplary architecture for the triangle unit of FIG. 4.

FIG. 5 is a schematic diagram of an exemplary architecture 500 for the triangle unit 402 of FIG. 4. As mentioned earlier, the triangle unit 402 generates plane equations. To accomplish this, the triangle unit 402 includes a set-up module 502 which receives the pixel data from the rasterizer 356. The set-up module 502 includes a denominator generator sub-module 504 for generating a denominator of the plane equations. The denominator generator sub-module 504 is coupled to a multiplier sub-module 506 of the set-up module 502 for scale offsetting the position information of the pixel data from the rasterizer 356 by a factor of a reciprocal of the denominator generated by the denominator generator sub-module 504. In one exemplary embodiment, the denominator generator sub-module 504 and the multiplier sub-module 506 of the triangle unit 402 may have 1.9.23 precision, where (x.y.z) refers to (sign, exponent, mantissa).

The triangle unit 402 further includes a pair of adder modules 508 for adding the position information of the pixel data. The output of the set-up module 502 and the adder modules 508 is then fed to a plane equation module 510 for reasons that will soon become apparent. In one exemplary embodiment, the adder modules 508 of the triangle unit 402 may have 1.8.23 precision, where (x.y.z) refers to (sign, exponent, mantissa).

The plane equation module 510 includes a pair of adder sub-modules 512 for adding vertex attributes. The adder sub-modules 512 are in turn coupled to a multiplier module 514 for providing a perspective correction in the form of a cylindrical wrap. As shown in FIG. 5, the output of the multiplier module 514 is fed back to the adder sub-modules 512.

The plane equation module 510 further includes a pair of sum-of-product sub-modules 515. These sum-of-product sub-modules 515 receive the sums from the adder modules 508 and the adder sub-modules 512, and the output of the set-up module 502 for calculating the equations set forth in Table 1.

TABLE 1

((a–b) (ya–yc) – (a–c) (ya–yb))/den
d_dx
((a–c) (xa–xb) – (a–b) (xa–xc))/den
d_dy In one exemplary embodiment, the sum-of-product sub-modules 515 and adder sub-modules 512 of the triangle unit 402 may have 1.9.23 and 1.8.23 precision, respectively, where (x.y.z) refers to (sign, exponent, mantissa).

The output of the sum-of-product sub-modules 515 of the plane equation module 510 is fed to an additional sum-of-products module 516 which also receives the sums from the adder modules 508 and the output of the set-up module 502. In operation, the sum-of-products module 516 calculates a base value using the equation set forth in Table 2.

TABLE 2 base = f – x d_dx – y d_dy

Still yet, the triangle unit 402 includes a shadow bound module 518 and a fog gamut clamping module 520. The shadow bound module 518 performs a special-case operation, while the fog gamut clamping module 520 calculates a minimum and maximum fog distance value possible across a triangle, and passes it down to the shader core module 408. Computed distance values that are outside this range may be clamped by the shader core module 408 to the gamut of fog distance values for the triangle.

As mentioned earlier, the triangle unit 402 calculates plane equations at different levels of precision using the pixel data, and further identifies a point of origin of the plane equations. Such levels of precision may include full floating point (i.e. 32-bit). Ideally, depth values are evaluated at higher levels of precision since they are more susceptible to error than other pixel data parameters.

Figure 6:
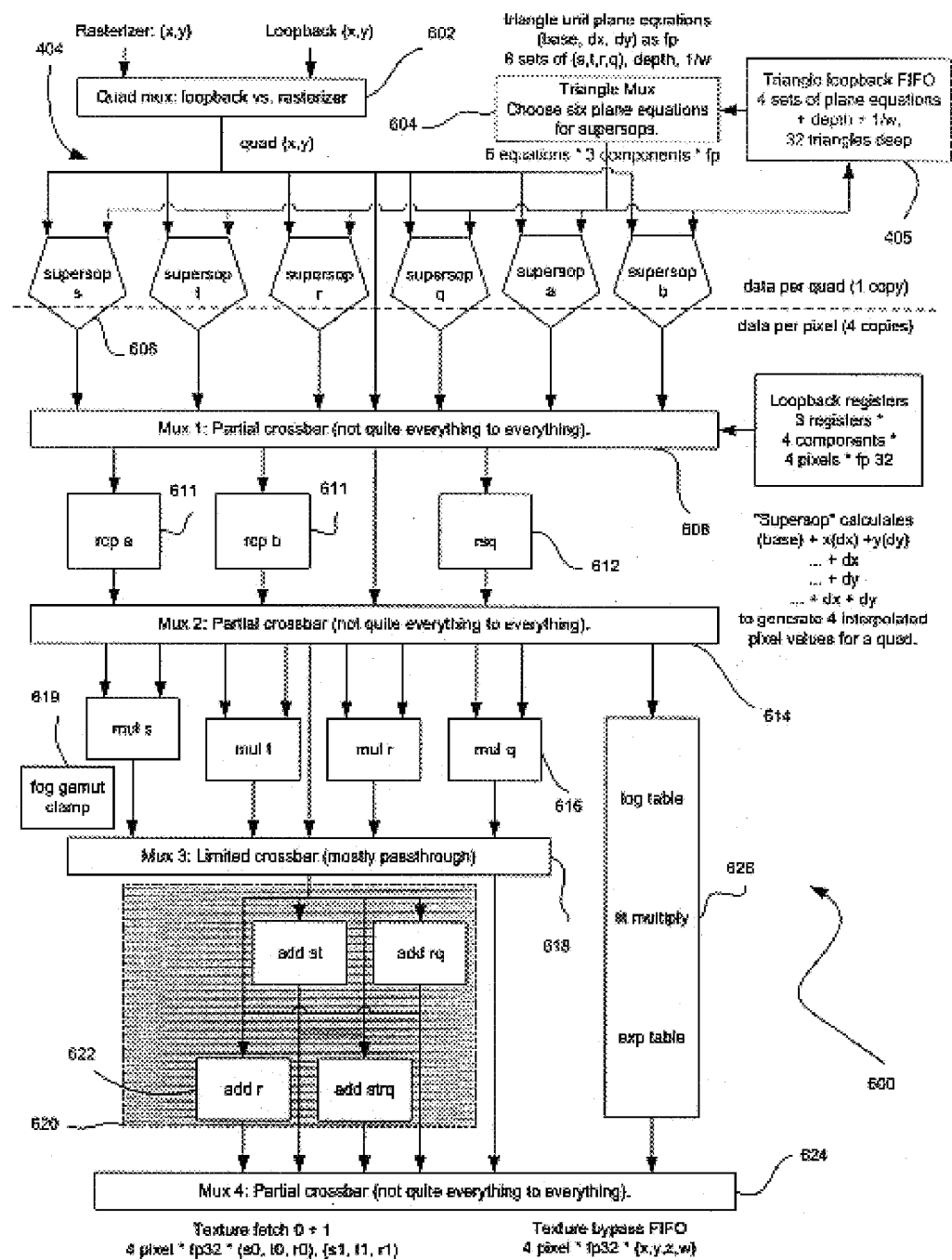
FIG. 6 is a schematic diagram of an exemplary architecture for the shader core module of FIG. 4.

FIG. 6 is a schematic diagram of an exemplary architecture 600 for the shader core module 404 of FIG. 4. As shown, a first multiplexer 602 is provided for selecting input from either the rasterizer 356 or the loopback triangle FIFO 405 which temporarily stores an output of the shader core module 404. Associated therewith is a second multiplexer 604 coupled to the triangle unit 402 for outputting multiple sets of arbitrary pairs of the attributes. In particular, the second multiplexer 604 receives eight (8) sets of attribute values, i.e. texture (s,t,r,q), depth, 1/w-value, etc., and generates three (3) sets of arbitrary pairs of the attributes.

Coupled to the multiplexers 602 and 604 are a plurality of sum-of-products modules 606 for generating sums of products utilizing the input provided by the multiplexers 602 and 604. In particular, the sum-of-products modules 606 generate four (4) interpolated values each associated with a particular one of four pixels in a "quad" using the plane equations. It should be noted that a quad refers to a group of contiguous pixels.

As shown in FIG. 6, the various components up to and including the sum-of-products modules 606 have only one copy per quad. Below the sum-of-products modules 606, the various components (reciprocals, multipliers, etc.) have one copy per pixel, or four copies per quad. It should be noted that this is an optional feature.

Also included is a third multiplexer 608 coupled between the sum of products modules 606, and a pair of reciprocal modules 611 and a reciprocal square root module 612. In one exemplary embodiment, the reciprocal modules 611 may be full precision, i.e. 32-bit, and the reciprocal square root module 612 may be half precision, i.e. 16-bit. In use, the reciprocal modules 611 are adapted for calculating a reciprocal of an inputted value, while the reciprocal square root module 612 serves to calculate a reciprocal square root of an input. Such modules, in turn, feed a fourth multiplexer 614. It should be noted that the reciprocal square root module 612 may be used in combination with multipliers and adders (to be described hereinafter) to perform additional Newton-Rhapson iterations and thereby increase the precision of operations thereof. As an option, a fog gamut clamp module 619 may be provided which clamps the fog distance value to the bounds calculated by the fog gamut clamp module 520 of FIG. 5.

The fourth multiplexer 614 is coupled to a plurality of multiplier modules 616 which are capable of multiplying various attributes, and feeding the products to a fifth multiplexer 618 that, in turn, feeds an adder module 620 including a plurality of adder sub-modules 622. In use, the adder sub-modules 622 of the adder module 620 are capable of being internally configured as a four (4) 2-input, two (2) 3-input, or one (1) 4-input adder. The adder module 620 is coupled to a sixth multiplexer 624. In use, the adder module 620 and multiplier modules 616 are capable of performing a plurality of operations which will be set forth hereinafter in greater detail during reference to FIG. 8.

Also coupled to the sixth multiplexer 624 are the fifth multiplexer 618 and a table module 626 which feeds output to the sixth multiplexer 624. Specifically, the table module 626 manages logarithm and exponential look-ups as well as lighting calculations. In operation, the various components 600 of the shader core module 404 are adapted to execute floating point calculations to perform shading operations, and generate two (2) sets of texture coordinates. As mentioned earlier, the shader core FIFO buffer 406 stores output of the floating point calculations generated by the shader core module 404 for use by the shader back end module 410. In one exemplary embodiment, the output of the floating point calculations generated by the shader core module 404 includes four (4) floating point values per cycle.

Figure 7:
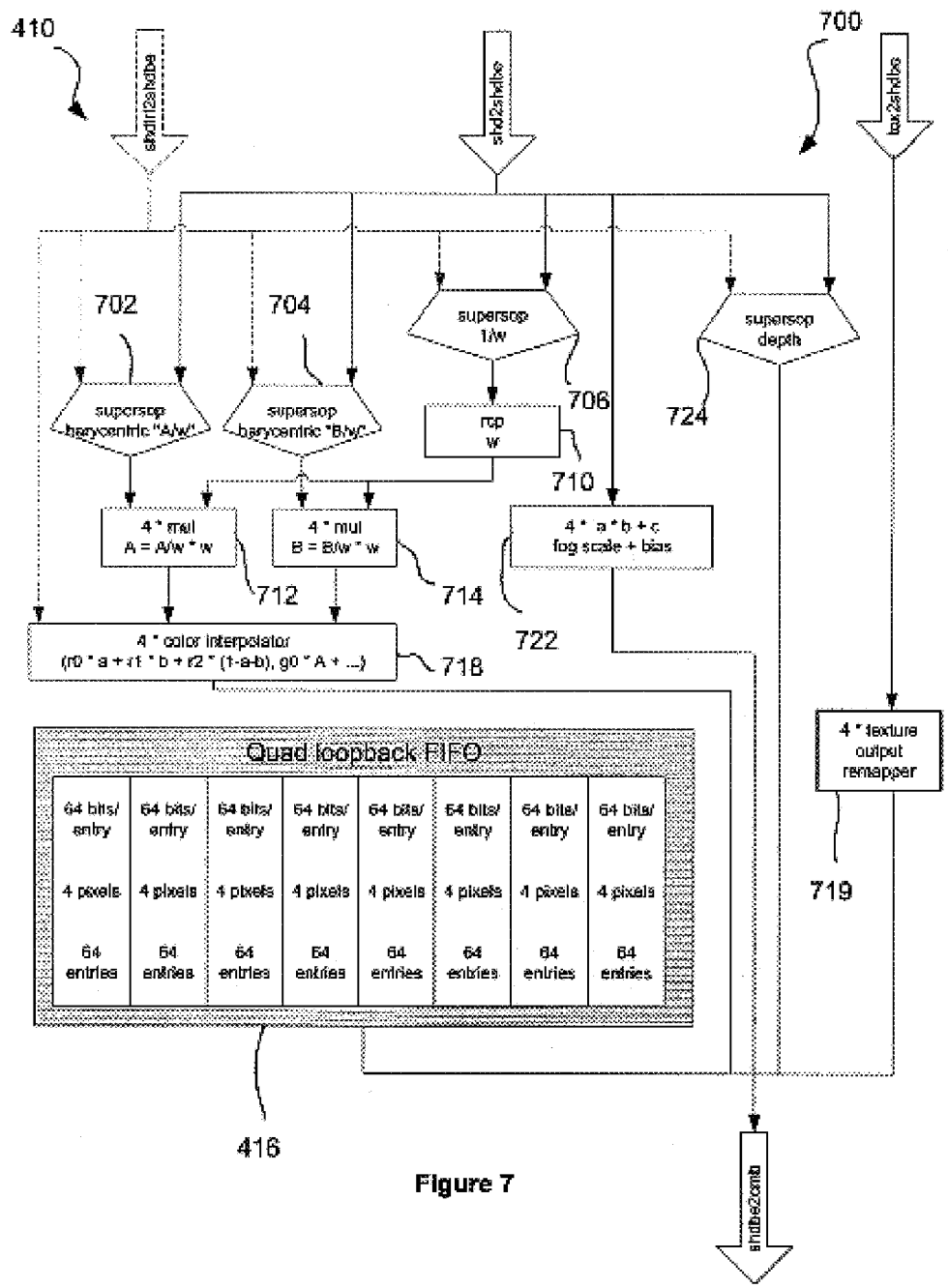
FIG. 7 is a schematic diagram of an exemplary architecture for the shader back end module of FIG. 4.

FIG. 7 is a schematic diagram of an exemplary architecture 700 for the shader back end module 410 of FIG. 4. As shown, a first sum-of-products module 702, a second sum-of-products module 704, and a third sum-of-products module 706 are coupled to the shader back end FIFO 412 and the shader core FIFO 406 for receiving the plane equations and the output of the floating point calculations.

In use, the first sum-of-products module 702 is capable of calculating the value "A/w", the second sum-of-products module 704 is capable of calculating the value "B/w", and the third sum-of-products module 706 is capable of calculating the value "1/w." The third sum-of-products module 706 is coupled to a reciprocal module 710 for calculating a w-value from an output of the third sum-of-products module 706. Such w-value is fed to a first multiplier module 712, and a second multiplier module 714 which are, in turn, coupled to the first and second sum-of-products modules (702 and 704), respectively. In operation, the first and second multiplier module (712 and 714) are capable of calculating an A-value and B-value, respectively. In one exemplary embodiment, the sum-of-products and multiplier modules of the shader back end module 410 may each have 1.8.11 precision, where (x.y.z) refers to (sign, exponent, mantissa). This division and multiplication by 1/w process is for perspectively correcting the interpolation of these parameters.

The first and second multiplier modules (712 and 714) are coupled to an interpolator module 718 for interpolating color data using the output of the first and second multiplier modules (712 and 714), the shader back end FIFO 412, and the shader core FIFO 406. In particular, the interpolator module 718 of the shader back end module 410 handles color interpolation of specular and diffused color values. This may be accomplished by interpolating lower precision barycentric weights, and perspective correcting them using the 1/w-value.

As an option, a fog scale calculator module 722 is provided which operates to calculate a final distance value associated with fog calculations. This fog distance value may be passed through a table to generate exponential or exponential-squared fog values. Also attached to the shader back end FIFO 412 and the shader core FIFO 406 is a fourth sum-of-products module 724 for calculating a depth sum of products. In one exemplary embodiment, the fourth sum-of-products module 724 of the shader back end module 410 may have 1.8.28 precision, where (x.y.z) refers to (sign, exponent, mantissa).

The output of the fourth sum-of-products module 724, fog scale calculator module 722 and interpolator module 718 is fed to the combiner module 414. A remapper 719 is located in the shader back end module 410. The remapper 719 serves to convert raw 32-bit data sent to it by the texture unit 408 into an appropriate set of floating point or integer formats for further calculations. It can convert 8- and 16-bit integer values to 12-bit integer, or 16- and 32-bit floating point representations. The remapper 719 is also capable of calculating the hemispherical completion of two components. For example, in a case where a texture produces the values a and b, the remapper 719 may calculate the square root of 1-a*a-b*b for further use by the combiner module 414.

The loopback quad FIFO 416 is architected to store information regarding the pixel quads that are currently being processed by the various components 400 of the present invention. As shown, the loopback quad FIFO 416 includes eight (8) partitions each with sixty-four (64) entries having sixty-four (64) bits per entry. In other embodiments, the size and configuration of the loopback quad FIFO 416 may be altered per the desires of the user. If a user program only uses four (4) registers, the loopback quad FIFO 416 can be configured for doubling the effective FIFO depth. If a user program uses sixteen (16) registers, the loopback quad FIFO 416 can be "double-pumped," with the first eight (8) registers and last eight (8) registers being pushed into the loopback quad FIFO 416 on alternate cycles. This scheme can be extended to trade off even more registers for FIFO depth.

The present invention provides a way for quads to move around multiple times through its various modules (i.e. shader core module 404, shader core FIFO buffer 406, a texture unit 408, shader back end module 410, combiner module 414, etc.). In one embodiment, this may be accomplished by inserting a packet (i.e. token) into the data stream that indicates the start, or end, of a particular loopback pass. As an option, the natural state may be the loopback.

The present invention may be able to run with more than one program (i.e. four) at once. This technique may also be used for multiple blocks of quads running the same program, but at different locations within that program. In some cases, the ability to obtain more packets in a later pass may be beneficial.

In one embodiment, datastreams may be expressed in the manner shown in Table 2-1.

TABLE 2-1 rasterizer -> QQQQQSSSSS -> shader
S = state bundle
Q = quad

In use, the data is processed from right to left. In one embodiment, state bundles may be provided, followed by five quads. At the entrance to the shader core module 404, there may be a gatekeeper module. The gatekeeper module may keep track of the number of packets in flight, and lock out packets when inserting them into the shader core module 404 could cause complications.

At the head of each block of quads, the gatekeeper module may insert a token indicating the start of a block of quads. In one embodiment, this could be just a bit. When the token passes by one of the modules of the present invention, for example, it loads the opcode that will be executed by that module on the particular pass into the "current opcode" storage for the module. These opcodes may be read from texture memory as necessary using the texture unit 408. By reading programs from memory, program store area is saved and one is allowed to run arbitrarily complex programs without significant cost.

All the quads behind the token may execute the same instruction. As an option, a special state may be tracked where objects in flight are expected to exit without looping around. Such data probably may not need tokens between state transitions. However, as soon as a mode passes the gatekeeper module which needs a loopback, there may be a need to start in on loopback modes until all such blocks have left the shader.

Appendix A illustrates an example of what happens in one loopback case.

The shader back end module 410 thus serves to convert the texture values received from the texture unit 408 to an appropriate floating point representation. In particular, the texture values are converted to a floating point representation that is consistent with that being used in the other various components 400 of the present invention. For example, the texture unit 408 may output texture values having a full floating point (i.e. 32-bit), half floating point (i.e. 16-bit), or integer precision, while the remaining components 400 may require a differing precision. The output of the shader back end module 410 is then sent to the combiner module 414 for combining the texture and color values.

FIG. 8 illustrates an instruction set of programmable operations 800 that may be carried out by the system 400 of the present invention, in accordance with one embodiment. It should be noted that the system 400 is capable of carrying out the programmable operations while supporting multiple levels of precision, i.e. full floating point (i.e. 32-bit), half floating point (i.e. 16-bit), and integer.

As shown in FIG. 8, such programmable operations 800 include a no operation, texture fetch, derivative, move, multiply, addition, multiply and addition, reciprocal, reciprocal square root, three component dot product, four component dot product, distance vector, minimum, maximum, pack, unpack, set on less than, set on greater or equal than, floor, fraction, kill pixel, exponential base two (2), logarithm base two (2), and light coefficients.

An exemplary assembly language will now be set forth which may be used to call each of the foregoing programmable operations 800. Such language refers to a plurality of resources delineated in Table 2A.

TABLE 2A

| Pixel Source (192B) | p[*] | of size 12 vectors |
|---|---|---|
| Constant Memory (512B) | c[*] | of size 32 vectors |
| Data Registers/Output (128B) | R0–R7, H0–H15, I0–I7 | of size 8, 16, 8 vectors |
| Condition Codes | RC, HC, IC | of size 4 bits |
| Instruction Storage | | of size 128 instructions |

The data registers and memory locations include four component floating point precision. Further, the registers may be accessed as full floating point precision (fp32:R0–R7), half floating point precision (fp16:H0–H15), or signed 12-bit integer precision (s12:I0–I7). These overlap as follows: R0/H0–H1/I0–I1, R1/H2–H3/I2–I3, R2/H4–H5/I4–I5, etc.

Vector components may be swizzled before use via four subscripts (xyzw). An arbitrary component re-mapping may be done. Some examples are shown in Table 2B.

TABLE 2B

.xyzw means source(x,y,z,w) -> input(x,y,z,w)
.zzxy means source(x,y,z,w) -> input(z,z,x,y)
.xxxx means source(x,y,z,w) -> input(x,x,x,x)
Shortcuts: no subscripts refers to .xyzw (same as writemask)
.x is the same as .xxxx
.y is the same as .yyyy
.z is the same as .zzzz
.w is the same as .wwww All source operands (except RC, HC, IC) may be negated by putting a '−' sign in front. The condition codes can be changed whenever data is written (by adding a 'c' to the op-code) and sharing the writemask with the destination. If there is no other destination, RC or HC or IC may be used as a dummy write register. When data is written, each component may be compared to 0.0 and its status recorded if the writemask for that component is enabled.

The condition codes are sourced as EQ(equal), NE(not equal), LT(less), GE(greater or equal), LE(less or equal), GT(greater), FL(false), and TR(true), which generates four (4) bits of condition code by applying the specified comparison. As a source (for KWL and writemask modification), the condition codes may be swizzled.

Writes to the register and RC are maskable. Each component is written only if it appears as a destination subscript (from xyzw). Specifying no writemask is the same as a writemask of xyzw. No swizzling may be possible for writemask, and subscripts may be ordered (x before y before z before w). It is also possible to modify the write mask by the RC (at the beginning of the instruction) by an 'AND' operation as set forth in Table 2C. It should be noted that RC has swizzle control.

TABLE 2C

| destination(GT.x) | //writemask[4] = 1111 & GT.xxxx |
|---|---|
| destination.xw(EQ.yyzz) | //writemask[4] = x00w & EQ.yyzz |

An exemplary assembler format is set forth in Table 2D.

TABLE 2D

OPCODE DESTINATION,SOURCE(S)

FIGS. 9A–9E illustrate the manner in which the various operations of FIG. 8 and other optional operations are mapped to the adder module 620 and multiplier modules 616 of the shader core module 404 in order to execute the same. More information will now be set forth regarding each of the programmable operations 800 of FIG. 8.

No Operation (NOP)

Format:
   NOP
Description:
   No Operation.
Examples:
   NOP

Texture Fetch (TEX,TXP,TXD)

Format:
   TEX[c] D[.xyzw][(RC[.xyzw])],[-]S0[.xyzw],#tid
   TXP[c] D[.xyzw][(RC[.xyzw])],[-]S0[.xyzw],#tid
   TXD[c] D[.xyzw][(RC[.xyzw])],[-]S0[.xyzw],[-]S1[.xyzw],[-]S2[.xyzw],#tid
Description:
   The contents of the source vector are used as a texture coordinate indexing into the specified (via tid:0–15) texture map. The filtered vector resulting is placed into the destination as a quad-float. TEX generates a texture fetch of (x,y,z) while TXP generates a texture fetch of (x/w,y/w,z/w). TXD allows specification of the derivative in x (S1) and y (S2). These may be used for LOD/anisotropic calculations. TXD generates a texture fetch of (x,y,z).

Operation:
   Table 3 sets forth an example of operation associated with the TEX, TXP, and TXD instructions.

TABLE 3

| t.x = source0.c***; | /* c is x or y or z or w */ |
|---|---|
| t.y = source0.*c**; | |
| t.z = source0.**c*; | |
| t.w = source0.***c; | |
| if (-source0) | |
|   t = -t; | |
| q = TextureFetch(t,texid); | |
| if (destination.x) R.x = q.x; | |
| if (destination.y) R.y = q.y; | |
| if (destination.z) R.z = q.z; | |
| if (destination.w) R.w = q.w; | |

Examples:
   TEX R2,R3,3 //Fetch from texture 3 using R3 as coords.

Derivative X (DDX)

Format:
   DDX[c] D[.xyzw][(RC[.xyzw])],[-]S0[.xyzw]
Description:
   DDX operates to ensure that the rate of change of the components of source with respect to the horizontal axis 'X' is placed into the destination.
Operation:
   Table 4 sets forth an example of operation associated with the DDX instruction.

TABLE 4

| t.x = source0.c***; | /* c is x or y or z or w */ |
|---|---|
| t.y = source0.*c**; | |
| t.z = source0.**c*; | |
| t.w = source0.***c; | |
| if (-source0) | |
|   t = -t; | |
| q.x = d(t.x)/dx; | |
| q.y = d(t.y)/dx; | |
| q.z = d(t.z)/dx; | |
| q.w = d(t.w)/dx; | |
| if (destination.x) R.x = q.x; | |
| it (destination.y) R.y = q.y; | |
| if (destination.z) R.z = q.z; | |
| if (destination.w) R.w = q.w; | |

Examples:
   DDX R2,R1 //Fetch x derivatives of R1

Derivative Y (DDY)

Format:
   DDY[c] D[.xyzw][(RC[.xyzw])],[-]S0[.xyzw]
Description:
   DDY operates to ensure that the rate of change of the components of source with respect to the vertical axis 'Y' is placed into the destination.
Operation:
   Table 5 sets forth an example of operation associated with the DDY instruction.

TABLE 5

| t.x = source0.c***; | /* c is x or y or z or w */ |
|---|---|
| t.y = source0.*c**; | |
| t.z = source0.**c*; | |
| t.w = source0.***c; | |
| if (-source0) | |
|   t = -t; | |

TABLE 5-continued

```
q.x = d(t.x)/dy;
q.y = d(t.y)/dy;
q.z = d(t.z)/dy;
q.w = d(t.w)/dy;
if (destination.x) R.x = q.x;
if (destination.y) R.y = q.y;
if (destination.z) R.z = q.z;
if (destination.w) R.w = q.w;
```

Examples:

DDY R2,R0 //Fetch y derivatives of R0

Move (MOV)

Format:

MOV[c] D[.xyzw][(RC[.xyzw])],[-]S0[.xyzw]

Description:

MOV operates to ensure that the contents of source are moved into the destination.

Operation:

Table 6 sets forth an example of operation associated with the MOV instruction.

TABLE 6

```
t.x = source0.c***;          /* c is x or y or z or w */
t.y = source0.*c**;
t.z = source0.**c*;
t.w = source0.***c;
if (-source0)
    t = -t;
q.x = t.x;
q.y = t.y;
q.z = t.z;
q.w = t.w;
if (destination.x) R.x = q.x;
if (destination.y) R.y = q.y;
if (destination.z) R.z = q.z;
if (destination.w) R.w = q.w;
```

Examples:

MOV CR,-R3 //Compare negative R3 to 0.0 and save

MOV R2,p[POS].w //Move w component of v[POS] into xyzw components of R2

MOV R1.xyw,R2.x //Move x component of R2 into x,y,w components of R1

Multiply (MUL)

Format:

MUL[c] D[.xyzw][(RC[.xyzw])],[-]S0[.xyzw],[-]S 1 [.xyzw]

Description:

MUL operates to multiply sources into the destination. It should be noted that 0.0 times anything is 0.0.

Operation:

Table 7 sets forth an example of operation associated with the MUL instruction.

TABLE 7

```
t.x = source0.c***;          /* c is x or y or z or w */
t.y = source0.*c**;
t.z = source0.**c*;
t.w = source0.***c;
if (-source0)
    t = -t;
u.x = source1.c***;          /* c is x or y or z or w */
u.y = source1.*c**;
u.z = source1.**c*;
```

TABLE 7-continued

```
u.w = source1.***c;
if (-source1)
    u = -u;
q.x = t.x*u.x;
q.y = t.y*u.y;
q.z = t.z*u.z;
q.w = t.w*u.w;
if (destination.x) R.x = q.x;
if (destination.y) R.y = q.y;
if (destination.z) R.z = q.z;
if (destination.w) R.w = q.w;
```

Examples:

MUL H6,H5,c[CON5] //H6.xyzw=H5.xyzw*c[CON5] .xyzw

MUL H6.x,H5.w,-H7 //H6.x =H5.w*-H7.x

Add (ADD)

Format:

ADD[c] D[.xyzw][(RC[.xyzw])],[-]S0[.xyzw],[-]S1 [xyzw]

Description:

ADD serves to add sources into the destination.

Operation:

Table 8 sets forth an example of operation associated with the ADD instruction.

TABLE 8

```
t.x = source0.c***;          /* c is x or y or z or w */
t.y = source0.*c**;
t.z = source0.**c*;
t.w = source0.***c;
if (-source0)
    t = -t;
u.x = source1.c***;          /* c is x or y or z or w */
u.y = source1.*c**;
u.z = source1.**c*;
u.w = source1.***c;
if (-source1)
    u = -u;
q.x = t.x+u.x;
q.y = t.y+u.y;
q.z = t.z+u.z;
q.w = t.w+u.w;
if (destination.x) R.x = q.x;
if (destination.y) R.y = q.y;
if (destination.z) R.z = q.z;
if (destination.w) R.w = q.w;
```

Examples:

ADD CH.x,H5.x,c[CON5] //Compare H5.x+c[CON5].x to 0.0 and set RC.x

ADD H6.x,H5,-H7 //H6.x =H5.x -H7.x

ADD H6,-H5,c[CON5] //H6.xyzw=-H5.xyzw+c[CON5] .xyzw

Multiply And Add (MAD)

Format:

MAD[c] D[.xyzw][(RC[.xyzw])],[-]S0[.xyzw],[-]S1 [.xyzw],[-]S2[.xyzw]

Description:

MAD serves to multiply and add sources into the destination. It should be noted that 0.0 times anything is 0.0.

Operation:

Table 9 sets forth an example of operation associated with the MAD instruction.

TABLE 9

```
t.x = source0.c***;           /* c is x or y or z or w */
t.y = source0.*c**;
t.z = source0.**c*;
t.w = source0.***c;
if (-source0)
        t = -t;
u.x = source1.c***;           /* c is x or y or z or w */
u.y = source1.*c**;
u.z = source1.**c*;
u.w = source1.***c;
if (-source1)
        u = -u;
v.x = source2.c***;           /* c is x or y or z or w */
v.y = source2.*c**;
v.z = source2.**c*;
v.w = source2.***c;
if (-source2)
        v = -v;
q.x = t.x*u.x+v.x;
q.y = t.y*u.y+v.y;
q.z = t.z*u.z+v.z;
q.w = t.w*u.w+v.w;
if (destination.x) R.x = q.x;
if (destination.y) R.y = q.y;
if (destination.z) R.z = q.z;
if (destination.w) R.w = q.w;
```

Examples:

MAD H6,−H5,p[POS],−H3  //H6=−H5*p[POS] −H3

MAD H6.z,H5.w,p[POS],H5  //H6.z=H5.w*p[POS].z+ H5.z

Reciprocal (RCP)

Format:

RCP[c] D[.xyzw][(RC[.xyzw])],[−]S0.[xyzw]

Description:

RCP inverts source scalar into the destination. The source may have one subscript. Output may be exactly 1.0 if the input is exactly 1.0.

RCP(−Inf) gives (−0.0,−0.0,−0.0,−0.0)

RCP(−0.0) gives (−Inf,−Inf,−Inf,−Inf)

RCP(+0.0) gives (+Inf,+Inf,+Inf,+Inf)

RCP(+Inf) gives (0.0,0.0,0.0,0.0)

Operation:

Table 10 sets forth an example of operation associated with the RCP instruction.

TABLE 10

```
t.x = source0.c***;           /* c is x or y or z or w */
t.y = source0.*c**;
t.z = source0.**c*;
t.w = source0.***c;
if (-source0)
        t = -t;
if (t.x == 1.0)
        q.x = q.y = q.z = q.w = 1.0;
else
        q.x = q.y = q.z = q.w = 1.0/t.x; where |q.x −
IEEE(1.0/t.x)| < 1/(2**22) for all 1.0<=t.x<2.0
if (destination.x) R.x = q.x;
if (destination.y) R.y = q.y;
if (destination.z) R.z = q.z;
if (destination.w) R.w = q.w;
```

Examples:

RCP R2,c[14].x  //R2.xyzw=1/c[14].x

RCP R2.w,R3.z  //R2.w=1/R3.z

Reciprocal Square Root (RSQ)

Format:

RSQ[c] D[.xyzw][(RC[.xyzw])],[−]S0.[xyzw]

Description:

RSQ performs an inverse square root of absolute value of source scalar into the destination. The source may have one subscript. Output may be exactly 1.0 if the input is exactly 1.0.

RSQ(0.0) gives (+Inf,+Inf,+Inf,+Inf)

RSQ(Inf) gives (0.0,0.0,0.0,0.0)

Operation:

Table 11 sets forth an example of operation associated with the RSQ instruction.

TABLE 11

```
t.x = source0.c***;           /* c is x or y or z or w */
t.y = source0.*c**;
t.z = source0.**c*;
t.w = source0.***c;
if (-source0)
        t = -t;
if (t.x == 1.0)
        q.x = q.y = q.z = q.w = 1.0;
else
        q.x=q.y=q.zq.w=1.0/sqrt(abs(t.x)); with |q.x −
IEEE(1.0/sqrt(t.x)) | < 1/(2**22) for 1.0<=t.x<4.0
if (destination.x) R.x = q.x;
if (destination.y) R.y = q.y;
if (destination.z) R.z = q.z;
if (destination.w) R.w = q.w;
```

Examples:

RSQ R3,R3.y  //R3=1/sqrt(abs(R3.y))

RSQ R2.w,p[9].x  //R2.w=1/sqrt(abs(p[9].x))

Three Component Dot Product (DP3)

Format:

DP3[c] D[.xyzw][(RC[.xyzw])],[−]S0[.xyzw],[−]S1 [.xyzw]

Description:

DP3 performs a three component dot product of the sources into the destination. It should be noted that 0.0 times anything is 0.0.

Operation:

Table 12 sets forth an example of operation associated with the DP3 instruction.

TABLE 12

```
t.x = source0.c***;           /* c is x or y or z or w */
t.y = source0.*c**;
t.z = source0.**c*;
t.w = source0.***c;
if (-source0)
        t = -t;
u.x = source1.c***;           /* c is x or y or z or w */
u.y = source1.*c**;
u.z = source1.**c*;
u.w = source1.***c;
if (-source1)
        u = -u;
q.x = q.y = q.z = q.w = t.x*u.x + t.y*u.y +
t.z*u.z;
if (destination.x) R.x = q.x;
if (destination.y) R.y = q.y;
if (destination.z) R.z = q.z;
if (destination.w) R.w = q.w;
```

Examples:

DP3 H6,H3,H4 //H6.xyzw=H3.x*H4.x+H3.y*H4.y+H3.z*H4.z

DP3 H6.w,H3,H4 //H6.w=H3.x*H4.x+H3.y*H4.y+H3.z*H4.z

Four Component Dot Product (DP4)

Format:

DP4[c] D[.xyzw][(RC[.xyzw])],[-]S0[.xyzw],[-]S1[.xyzw]

Description:

DP4 performs a four component dot product of the sources into the destination. It should be noted that 0.0 times anything is 0.0.

Operation:

Table 13 sets forth an example of operation associated with the DP4 instruction.

TABLE 13

```
t*x = source0.c***;          /* c is x or y or z or w */
t*y = source0.*c**;
t.z = source0.**c*;
t.w = source0.***c;
if (-source0)
    t = -t;
u.x = source1.c***;          /* c is x or y or z or w */
u.y = source1.*c**;
u.z = source1.**c*;
u.w = source1.***c;
if (-source1)
    u = -u;
q.x = q.y = q.z = q.w = t.x*u.x + t.y*u.y +
    t.z*u.z + t.w*u.w;
if (destination.x) R.x = q.x;
if (destination.y) R.y = q.y;
if (destination.z) R.z = q.z;
if (destination.w) R.w = q.w;
```

Examples:

DP4 H6,p[POS],c[MV0] //H6.xyzw=p.x*c.x+p.y*c.y+p.z*c.z+p.w*c.w

DP4 H6.xw,p[POS].w,H3 //H6.xw p.w*H3.x+p.w*H3.y+p.w*H3.z+p.w*H3.w

Distance Vector (DST)

Format:

DST[c] D[.xyzw][(RC[.xyzw])],[-]S0[.xyzw],[-]S[.xyzw]

Description:

DST calculates a distance vector. A first source vector is assumed to be (NA,d*d,d*d,NA) and second source vector is assumed to be (NA,1/d,NA,1/d). A destination vector is then (1,d,d*d,1/d). It should be noted that 0.0 times anything is 0.0.

Operation:

Table 14 sets forth an example of operation associated with the DST instruction.

TABLE 14

```
t.x = source0.c***;          /* c is x or y or z or w */
t.y = source0.*c**;
t.z = source0.**c*;
t*w = source0.***c;
if (-source0)
    t = -t;
u.x = source1.c***;          /* c is x or y or z or w */
u.y = source1.*c**;
u.z = source1.**c*;
```

TABLE 14-continued

```
u.w = source1.***c;
if (-source1)
    u = -u;
q.x = 1.0;
q.y = t.y*u.y;
q.z = t.z;
q.w = u.w;
if (destination.x) R.x = q.x;
if (destination.y) R.y = q.y;
if (destination z) R.z = q.z;
if (destination.w) R.w = q.w;
```

Examples:

DST R2,R3,H4 //R2.xyzw=(1.0,R3.y*H4.y,R3.z,H4.w)

Minimum (MIN)

Format:

MIN[c] D[.xyzw][(RC[.xyzw])],[-]S0[.xyzw],[-]S1[.xyzw]

Description:

MIN serves to move a minimum of sources into the destination.

Operation:

Table 15 sets forth an example of operation associated with the MIN instruction.

TABLE 15

```
t.x = source0.c***;          /* c is x or y or z or w */
t.y = source0.*c**;
t.z = source0.**c*;
t.w = source0.***c;
if (-source0)
    t = -t;
u.x = source1.c***;          /* c is x or y or z or w */
u.y = source1.*c**;
u.z = source1.**c*;
u.w = source1.***c;
if (-source1)
    u = -u;
q.x = (t.x < u.x) ? t.x : u.x;
q.y = (t.y < u.y) ? t.y : u.y;
q.z = (t.z < u.z) ? t.z : u.z;
q.w = (t.w < u.w) ? t.w : u.w;
if (destination.x) R.x = q.x;
if (destination.y) R.y = q.y;
if (destination.z) R.z = q.z;
if (destination.w) R.w = q.w;
```

Examples:

MIN R2,R3,H0 //R2=component min(R3,H0)

MIN R2.x,R3.z,H0 //R2.x=min(R3.z,H0.x)

MIN CH,R3.z,H0 //Compare min(R3.z,H0.xyzw) to 0.0 and set RC

Maximum (MAX)

Format:

MAX[c] D[.xyzw][(RC[.xyzw])],[-]S0[.xyzw],[-]S1[.xyzw]

Description:

MAX moves a maximum of sources into the destination.

Operation:

Table 16 sets forth an example of operation associated with the MAX instruction.

TABLE 16

```
t.x = source0.c***;        /* c is x or y or z or w */
t.y = source0.*c**;
t.z = source0.**c*;
t.w = source0.***c;
if (-source0)
    t = -t;
u.x = source1.c***;        /* c is x or y or z or w */
u.y = source1.*c**;
u.z = source1.**c*;
u.w = source1.***c;
if (-source1)
    u = -u;
q.x = (t.x >= u.x) ? t.x : u.x;
q.y = (t.y >= u.y) ? t.y : u.y;
q.z = (t.z >= u.z) ? t.z : u.z;
q.w = (t.w >= u.w) ? t.w : u.w;
if (destination.x) R.x = q.x;
if (destination.y) R.y = q.y;
if (destination.z) R.z = q.z;
if (destination.w) R.w = q.w;
```

Examples:

MAX R2,R3,H0 //R2=component max(R3,H0)

MAX R2.w,R3.x,H0 //R2.w=max(R3.x,H0.w)

Pack2 (PK2)

Format:

PK2[c] D[.xyzw][(RC[.xyzw])],[-]S0[.xyzw]

Description:

PK2 packs two source components (.xy after swizzle) into the destination. The destination may be a fp32 "R" register. The source components are converted into fp16 format and packed into the destination.

Operation:

Table 17 sets forth an example of operation associated with the PK2 instruction.

TABLE 17

```
t.x = source0.c***;        /* c is x or y or z or w */
t.y = source0.*c**;
t.z = source0.**c*;
t.w = source0.***c;
if (-source0)
    t = -t;
t.x = fp16(t.x);
t.y = fp16(t.y);
q.x = q.y = q.z = q.w = ((t.x) | (t.y<<16));    /* raw bit packing */
if (destination.x) R.x = q.x;
if (destination.y) R.y = q.y;
if (destination.z) R.z = q.z;
if (destination.w) R.w = q.w;
```

Examples:

PK2 R0.z,R3 //pack x,y components of R3 into R0.z

Pack4 (PK4)

Format:

PK4[c] D[.xyzw][(RC[.xyzw])],[-]S0[.xyzw]

Description:

PK4 packs four source components into the destination. The destination may be a fp32 "R" register. The source components are clamped to the range (−1.008,1.0) before being packed into the destination as unsigned 8 bit bytes.

Operation:

Table 18 sets forth an example of operation associated with the PK4 instruction.

TABLE 18

```
t.x = source0.c***;        /* c is x or y or z or w */
t.y = source0.*c**;
t.z = source0.**c*;
t.w = source0.***c;
if (-source0)
    t = -t;
q.x = t.x; if (q.x > 1.0) q.x = 1.0; else if (q.x < -1.008) q.x = -1.008;
q.y = t.y; if (q.y > 1.0) q.y = 1.0; else if (q.y < -1.008) q.y = -1.008;
q.z = t.z; if (q.z > 1.0) q.z = 1.0; else if (q.z < -1.008) q.z = -1.008;
q.w = t.w; if (q.w >1.0) q.w = 1.0; else if (q.w < -1.008) q.w = -1.008;
ub.x = 127.0*q.x + 128;        /* ub is unsigned byte vector */
ub.y = 127.0*q.y + 128;
ub.z = 127.0*q.z + 128;
ub.w = 127.0*q.w + 128;
q.x = q.y = q.z = q.w = ((ub.x) | (ub.y<<8) | (ub.z<<16) | (ub.w<<24));   /* raw bit packing */
if (destination.x) R.x = q.x;
if (destination.y) R.y = q.y;
if (destination z) R.z = q.z;
if (destination.w) R.w = q.w;
```

Examples:

PK4 R0.z,R3 //pack 4 components of R3 into R0.z

Unpack2 (UP2)

Format:

UP2[c] D[.xyzw][(RC[.xyzw])],[-]S0.[xyzw]

Description:

UP2 unpacks source component into the destination. The source may be a fp32 "R" register scalar. The source component is assumed to be a packed fp16 pair.

Operation:

Table 19 sets forth an example of operation associated with the UP2 instruction.

TABLE 19

```
t.x = source0.c***;        /* c is x or y or z or w */
t.y = source0.*c**;
t.z = source0.**c*;
t.w = source0.***c;
if (-source0)
    t = -t;
q.x = q.z = (t.x>> 0) & 0xffff;    /* use raw bits if t.x */
q.y = q.w = (t.x>> 16) & 0xffff;   /* use raw bits if t.x */
if (destination.x) R.x = q.x;
if (destination.y) R.y = q.y;
if (destination.z) R.z = q.z;
if (destination.w) R.w = q.w;
```

Examples:

UP2 R0.xy,R3.y //unpack two components of R3.y into R0.xy

Unpack4 (UP4)

Format:

UP4[c] D[.xyzw][(RC[.xyzw])],[-]S0[xyzw]

Description:

UP4 unpacks source component into the destination. The source may be a fp32 "R" register scalar. The source component is assumed to be a packed unsigned 8 bit quartet and all are biased and scaled back into the range (−1.008, 1.0) before assignment to the destination.

Operation:

Table 20 sets forth an example of operation associated with the UP4 instruction.

TABLE 20

```
t.x = source0.c***;              /* c is x or y or z or w */
t.y = source0.*c**;
t.z = source0.**c*;
t.w = source0.***c;
if (−source0)
    t = −t;
q.x = (t.x>> 0) & 0xff;          /* use raw bits if t.x */
q.y = (t.x>> 8) & 0xff;          /* use raw bits if t.x */
q.z = (t.x>> 16) & 0xff;         /* use raw bits if t.x */
q.w = (t.x>> 24) & 0xff;         /* use raw bits if t.x */
q.x = (q.x − 128)/127.0;
q.y = (q.y − 128)/127.0;
q.z = (q.z − 128)/127.0;
q.w = (q.w − 128)/127.0;
if (destination.x) R.x = q.x;
if (destination.y) R.y = q.y;
if (destination.z) R.z = q.z;
if (destination.w) R.w = q.w;
```

Examples:
    UP4 R0,R3.x //unpack four components of R3.x into R0.xyzw

Set On Less Than (SLT)

Format:
    SLT[c] D[.xyzw][(RC[.xyzw])],[−]S0[.xyzw],[−]S1[.xyzw]

Description:
    SLT sets the destination to 1.0/0.0 if source0 is less_than/greater_or_equal to source1. The following relationships should be noted:
    SetEQ R0,R1=(SGE R0,R1)*(SGE −R0,−R1)
    SetNE R0,R1=(SLT R0,R1)+(SLT −R0,−R1)
    SetLE R0,R1 =SGE −R0,−R1
    SetGT R0,R1 =SLT −R0,−R1

Operation:
    Table 21 sets forth an example of operation associated with the SLT instruction.

TABLE 21

```
t*x = source0.c***;              /* c is x or y or z or w */
t.y = source0.*c**;
t.z = source0.**c*;
t.w = source0.***c;
if (−source0)
    t = −t;
u.x = source1.c***;              /* c is x or y or z or w */
u.y = source1.*c**;
u.z = source1.**c*;
u.w = source1.***c;
if (−source1)
    u = −u;
q.x = (t.x < u.x) ? 1.0 : 0.0;
q.y = (t.y < u.y) ? 1.0 : 0.0;
q.z = (t.z < u.z) ? 1.0 : 0.0;
q.w = (t.w < u.w) ? 1.0 : 0.0;
if (destination x) R.x = q.x;
if (destination.y) R.y = q.y;
if (destination.z) R.z = q.z;
if (destination.w) R.w = q.w;
```

Examples:
    SLT H4,H3,H7 //H4.xyzw=(H3.xyzw<H7.xyzw ? 1.0:0.0)
    SLT H3.xz,H6.w,H4 //H3.xz=(H6.w<H4.xyzw ? 1.0:0.0)

Set On Greater Or Equal Than (SGE)

Format:
    SGE[c] D[.xyzw][(RC[.xyzw])],[−]S0[.xyzw],[−]S1[.xyzw]

Description:
    SGE sets the destination to 1.0/0.0 if source0 is greater_or_equal/less_than source1.

Operation:
    Table 22 sets forth an example of operation associated with the SGE instruction.

TABLE 22

```
t.x = source0.c***;              /* c is x or y or z or w */
t.y = source0.*c**;
t.z = source0.**c*;
t.w = source0.***c;
if (−source0)
    t = −t;
u.x = source1.c***;              /* c is x or y or z or w */
u.y = source1.*c**;
u.z = source1.**c*;
u.w = source1.***c;
if (−source1)
    u = −u;
q.x = (t.x >= u.x) ? 1.0 : 0.0;
q.y = (t.y >= u.y) ? 1.0 : 0.0;
q.z = (t.z >= u.z) ? 1.0 : 0.0;
q.w = (t.w >= u.w) ? 1.0 : 0.0;
if (destination.x) R.x = q.x;
if (destination.y) R.y = q.y;
if (destination.z) R.z = q.z;
if (destination.w) R.w = q.w;
```

Examples:
    SGE H4,H3,H7 //H4.xyzw=(H3.xyzw>=H7.xyzw ? 1.0:0.0)
    SGE H3.xz,H6.w,H4 //H3.xz=(H6.w>=H4.xyzw ? 1.0:0.0)

Floor (FLR)

Format:
    FLR[c] D[.xyzw][(RC[.xyzw])],[−]S0[.xyzw]

Description:
    FLR sets the destination to floor of the source.

Operation:
    Table 23 sets forth an example of operation associated with the FLR instruction.

TABLE 23

```
t.x = source0.c***;              /* c is x or y or z or w */
t.y = source0.*c**;
t.z = source0.**c*;
t.w = source0.***c;
if (−source0)
    t = −t;
q.x = floor(t.x);
q.y = floor(t.y);
q.z = floor(t.z);
q.w = floor(t.w);
if (destination.x) R.x = q.x;
if (destination.y) R.y = q.y;
if (destination.z) R.z = q.z;
if (destination.w) R.w = q.w;
```

Examples:
    FLR H4.z,R3 //H4.z=floor(R3.z)

Fraction (FRC)

Format:
    FRC[c] D[.xyzw][(RC[.xyzw])],[−]S0[.xyzw]

Description:
    FRC sets destination to fractional part of the source. The fraction is 0.0<=fraction<1.0.

Operation:
    Table 24 sets forth an example of operation associated with the FRC instruction.

TABLE 24

```
t.x = source0.c***;              /* c is x or y or z or w */
t.y = source0.*c**;
t.z = source0.**c*;
t.w = source0.***c;
if (-source0)
        t = -t;
q.x = t.x - floor(t.x);
q.y = t.y - floor(t.y);
q.z = t.z - floor(t.z);
q.w = t.w - floor(t.w);
if (destination.x) R.x = q.x;
if (destination.y) R.y = q.y;
if (destination.z) R.z = q.z;
if (destination.w) R.w = q.w;
```

Examples:

FRC H4.z,R3 //H4.z=R3.z−floor(R3.z)

Kill Pixel (KIL)

Format:

KIL RC[.xyzw]

Description:

KIL kills the pixel based on any of the RC bits (post swizzle) being TRUE. KIL cannot set the condition codes.

Operation:

Table 25 sets forth an example of operation associated with the KIL instruction.

TABLE 25

```
b.x = RC.c***;                   /* c is x or y or z or w */
b.y = RC.*c**;
b.z = RC.**c*;
b.w = RC.***c;
if (b.x | b.y | b.z | b.w)
        Kill pixel;
```

Examples:

KIL EQ //Kill pixel if RC x or y or z or w are=0.0

KIL LT.x //Kill pixel if RC x bit<0.0

KIL NE.xxzz //Kill pixel if x or z RC bits !=0.0

Exponential Base 2 (EXP)

Format:

EXP[c] D[.xyzw][(RC[.xyzw])],[−]S0.[xyzw]

Description:

EXP generates approximate answer in dest.z and allows for a more accurate answer of dest.x*FUNC(dest.y) where FUNC is some user approximation to 2**dest.y (0.0<=dest.y<1.0). EXP accepts a scalar source0. Reduced precision arithmetic is acceptable in evaluating dest.z.

EXP(−Inf) or underflow gives (0.0,0.0,0.0,1.0)

EXP(+Inf) or overflow gives (+Inf,0.0,+Inf,1.0)

Operation:

Table 26 sets forth an example of operation associated with the EXP instruction.

TABLE 26

```
t.x = source0.c***;              /* c is x or y or z or w */
t.y = source0.*c**;
t.z = source0.**c*;
t.w = source0.***c;
if (-source0)
        t = -t;
q.x = 2**TruncateTo-Infinity(t.x);
q.y = t.x - TruncateTo-Infinity(t.x);
```

TABLE 26-continued

```
q.z = q.x * APPX(q.y); where
| exp(q.y*LN2) - APPX(q.y) | < 1/(2**11) for all 0<=q.y<1.0
q.w = 1.0;
if (destination.x) R.x = q.x;
if (destination.y) R.y = q.y;
if (destination.z) R.z = q.z;
if (destination.w) R.w = q.w;
```

Examples:

EXP H4,R3.z

Logarithm Base 2 (LOG)

Format:

LOG[c] D[.xyzw][(RC[.xyzw])],[−]S0.[xyzw]

Description:

LOG generates an approximate answer in dest.z and allows for a more accurate answer of dest.x+FUNC(dest.y) where FUNC is some user approximation of log2(dest.y) (1.0<=dest.y <2.0). LOG accepts a scalar source0 of which the sign bit is ignored. LOG provides reduced precision arithmetic is acceptable in evaluating dest.z.

LOG(0.0) gives (−Inf,1.0,−Inf,1.0)

LOG(Inf) gives (Inf,1.0,Inf,1.0)

Operation:

Table 27 sets forth an example of operation associated with the LOG instruction.

TABLE 27

```
t.x = source0.c***;              /* c is x or y or z or w */
t.y = source0.*c**;
t.z = source0.**c*;
t.w = source0.***c;
if (-source0)
        t = -t;
if (abs(t.x) != 0.0) {
        q.x = exponent(t.x)      (-128.0 <= e < 127)
        q.y = mantissa(t.x)      (1.0 <= m < 2.0)
        q.z = q.x + APPX(q.y)    where
|log(q.y)/LN2-APPX(q.y) | < 1/(2**11) for all
1.0<=q.y<2.0
        q.w = 1.0;
        }
else {
        q.x = -inf; q.y = 1.0; q.z = -inf; q.w = 1.0;
        }
if (destination.x) R.x = q.x;
if (destination.y) R.y = q.y;
if (destination.z) R.z = q.z;
if (destination.w) R.w = q.w;
```

Examples:

LOG H4,R3.z

Light Coefficients (LIT)

Format:

LIT[c] D[.xyzw][(RC[.xyzw])],[−]S0[.xyzw]

Description:

LIT provides lighting partial support. LIT calculates lighting coefficients from two dot products and a power (which gets clamped to −128.0<power<128.0). Source vector is:

Source0.x=n*l (unit normal and light vectors)

Source0.y=n*h (unit normal and halfangle vectors)

Source0.z is unused

Source0.w=power

Reduced precision arithmetic is acceptable in evaluating dest.z. Allowed error is equivalent to a power function combining the LOG and EXP instructions (EXP(w*LOG (y))). An implementation may support at least 8 fraction bits in the power. It should be noted that since 0.0 times anything may be 0.0, taking any base to the power of 0.0 will yield 1.0.

Operation:

Table 28 sets forth an example of operation associated with the LIT instruction.

TABLE 28

```
t.x = source0.c***;         /* c is x or y or z or w */
t.y = source0.*c**;
t.z = source0.**c*;
t.w = source0.***c;
if (-source0)
    t = -t;
if (t.w < -127.9961)     t.w = -127.9961; /* assuming power is s8.8 */
else if (t.w > 127.9961) t.w = 127.9961;
if (t.x < 0.0) t.x = 0.0;
if (t.y < 0.0) t.y = 0.0;
q.x = 1.0;
/* ambient */
q.y = t.x;
/* diffuse */
q.z = (t.x > 0.0 ? EXP(t.w*LOG(t.y)) : 0.0);
/* specular */
q.w = 1.0;
if (destination.x) R.x = q.x;
if (destination.y) R.y = q.y;
if (destination.z) R.z = q.z;
if (destination.w) R.w = q.w;
```

Examples:

LIT R0,R3

APPENDIX A

1) Rasterizer inserts lots of state bundles. Such bundles go into the pipeline unchanged.
rasterizer--->QQQQQSSSSS
gatekeeper-------------------|
2) Eventually, a quad enters the pipeline. The gatekeeper inserts a token at that point. This token is marked as the main token. (It gets a capital T.)
QQQQQTSSSSSS
gatekeeper-|
3) Since this is the first quad of a first pass, it notifies the texture unit to save the current state as it passes. In this simple case, it won't be necessary, but in more complicated cases, the saving and restoring of the texture state necessary, which will be mentioned later.
4) As the packets reach the end of the pipeline, the state bundles get to pass along freely, and can be subtracted from the count of active packets in flight.
QQQQQT SSSSSSSSSS
end of shader----| packets that got away
5) When the token gets to the end of the shader, since it's a loopback token, it goes back to the beginning. At that point, the gatekeeper switches into a mode where it doesn't allow any additional packets to come in from the rasterizer, and it starts to count how many packets are passing it. After all the known packets go past, if there's still space, the gatekeeper could allow another block of quads in.
QQT . . . QQQ
beginning of shader---| . . . |---end of shader
6) These loops keep happening. Eventually, the token gets to the end of the pipeline. When the token first gets there, the beginning of the shader is notified that there's now a new slot to accept more objects. The token loops back to perform this notification, but doesn't immediately need to move forward again. The quads all work their way out of the system, and into the ROP.
QQQQT
end of shader--------|
The next most complicated case would be when state bundles show up during step 3. Then, state saving and restoring is started. So, as before, the rasterizer inserts objects in to the shader. The gatekeeper inserts s token at the start of the APPENDIX A-continued first state-to-quad transition:
SSSSSQQQQQTSSSSS
gatekeeper---|
The state bundles trailing behind the quads aren't treated any differently from the remaining quads; they flow through normally. However, the token marked as the first token issues a "save" command to the texture unit requiring it to save the current state, when it passes by the texture unit on the first pass. When it loops back on subsequent passes, it issues a "restore" command to restore the state back to the original state. All the state bundles have their normal effect on the texture unit; the save / restore pair ensures proper operation.
When the token exits the shader, all the quads and state bundles behind it follow it out, until the next token.
In one embodiment, there may be a multiple packet version of the present example.
QQSSQQQQQTSSSSS
gatekeeper--|
When the second set of quads comes by, assuming there's space for everything to enter the pipe, another token gets inserted in the pipeline. This token, however, isn't the main token, so it is represented with a small "t."
QQtSSQQQQQTSSSSS
|--gatekeeper
Subsequent collections of state bundles and quads are inserted into the pipeline as described above. Every time there is a state bundle-to-quad transition, a secondary token is inserted. These tokens mark the start of "blocks" of quads, all of which operate with the same program, at the same computer.
QQQtSQQQtSSSSSQQQQQTSSSSS
|--gatekeeper
As before, eventually the shader is full of packets, and it holds off any new packets from entering. The leading state bundles exit the shader, and the state save/restore as described above continues to function.
At this point, there can conceivably be multiple programs running through the pipeline at the same time. However, the sequence of quads flowing through the pipeline must be maintained. Therefore, if any particular block of quads reaches the end of a program, it still has to continue to loop around in the pipeline until all the quads ahead of it are outputted.
When the first quad block reaches the end of the program, the leading token and quads thereof all escape to the ROP. However, the trailing state bundles cannot. Such state bundles loop around again.
QQQtSQQQtSSSSSQQQQQTSSSSS
bundles must loop---|---these packets all get to the ROP.
At this point, the leading secondary token is promoted to being the principal token (T instead of t). Because the state bundles still are to be processed, the state bundles may be sent back to the shader. A restore token is inserted before the state bundles, so that one can restore to the pipeline state before them. Then, the principal token following the state bundles issues a save command, and saves any subsequent state.
QQQtSQQQTSSSSSR
Once the restore token has looped around and made it to the end of the shader, it is cut off, and the next set of state bundles can be forwarded to the ROP. Then, the next leading token may either be processed, or sent to the ROP, as appropriate.

While various embodiments have been described above, it should be understood that they have been presented by way of example only, and not limitation. Thus, the breadth and scope of a preferred embodiment should not be limited by any of the above described exemplary embodiments, but should be defined only in accordance with the following claims and their equivalents.

What is claimed is:

1. A system for processing pixel data in a graphics pipeline, comprising:

(a) a triangle module coupled to a rasterizer for calculating a plurality of equations using pixel data received from the rasterizer;

(b) a shader core module coupled to the rasterizer for receiving the pixel data therefrom and the triangle module for receiving the equations therefrom, the shader core module capable of executing floating point calculations and generating texture coordinates using the pixel data;

(c) a texture module coupled to the shader core module, the texture module capable of looking up texture values using the texture coordinates;

(d) a shader back end module coupled to the texture module and the triangle module, the shader back end module capable of converting the texture values to an appropriate floating point representation and generating color values using the equations; and (e) a combiner module coupled to the shader core module and the shader back end module, the combiner module capable of combining the color values and the texture values.

2. The system as recited in claim 1, and further comprising a buffer coupled between the triangle module and the shader core module for temporarily storing an output of the triangle module for use by the shader core module.

3. The system as recited in claim 1, and further comprising a buffer coupled between the triangle module and the shader back end module for temporarily storing the equations for use by the shader back end module.

4. The system as recited in claim 1, and further comprising a buffer coupled between the shader core module and the shader back end module for temporarily storing an output of the floating point calculations for use by the shader back end module.

5. The system as recited in claim 1, and further comprising a buffer coupled between the shader back end module and the combiner module for temporarily storing an output of the combiner module for use by the shader back end module.

6. The system as recited in claim 1, wherein a plurality of precisions are supported.

7. The system as recited in claim 6, wherein the precisions include full precision floating point, a half precision floating point and an integer.

8. The system as recited in claim 1, wherein the floating point calculations are selected from the group consisting of no operation, texture fetch, derivative, move, multiply, addition, multiply and addition, reciprocal, reciprocal square root, three component dot product, four component dot product, distance vector, minimum, maximum, pack, unpack, set on less than, set on greater or equal than, floor, fraction, kill pixel, exponential base two (2), logarithm base two (2), and light coefficients.

9. The system as recited in claim 1, wherein the shader core module and the combiner module are coupled via a loopback path for allowing the shader core module to utilize an output of the combiner module.

10. The system as recited in claim 1, wherein the triangle module includes a plurality of sum-of-products modules.

11. The system as recited in claim 1, wherein the shader core module includes a plurality of sum-of-products modules.

12. The system as recited in claim 1, wherein the shader back end module includes a plurality of sum-of-products modules.

13. A method for processing pixel data in a graphics pipeline, comprising:

(a) calculating a plurality of equations with pixel data received from a rasterizer utilizing a first module;

(b) executing floating point calculations and generating texture coordinates with the pixel data utilizing a second module coupled to the first module;

(c) looking up texture values with the texture coordinates utilizing a third module coupled to the second module;

(d) converting the texture values to an appropriate floating point representation and generating color values with the equations utilizing a fourth module coupled to the third module; and (e) combining the color values and the texture values utilizing a fifth module coupled to the fourth module.

14. A computer product for processing pixel data in a graphics pipeline, comprising:

(a) a computer signal for calculating a plurality of equations with pixel data received from a rasterizer;

(b) a computer signal for executing floating point calculations and generating texture coordinates with the pixel data;

(c) a computer signal for looking up texture values with the texture coordinates;

(d) a computer signal for converting the texture values to an appropriate floating point representation and generating color values with the equations; and (e) a computer signal for combining the color values and the texture values.

15. A system for processing pixel data in a graphics pipeline, comprising:

(a) a first module coupled to a rasterizer for calculating a plurality of equations using pixel data received from the rasterizer;

(b) a second module coupled to the rasterizer for receiving the pixel data therefrom and the first module for receiving the equations therefrom, the second module capable of executing floating point calculations and generating texture coordinates using the pixel data;

(c) a third module coupled to the second module, the third capable of looking up texture values using the texture coordinates;

(d) a fourth module coupled to the second module and the third module, the fourth module capable of converting the texture values to an appropriate floating point representation and generating color values using the equations;

(e) a fifth module coupled to the second module and the fourth module, the fifth module capable of combining the color values and the texture values;

(f) a first buffer coupled between the first module and the second module for temporarily storing an output of the first module for use by the second module;

(g) a second buffer coupled between the first module and the fourth module for temporarily storing the equations for use by the fourth module;

(h) a third buffer coupled between the second module and the fifth module for temporarily storing an output of the floating point calculations for use by the fifth module; and (i) a fourth buffer coupled between the fourth module and the fifth module for temporarily storing an output of the fifth module for use by the fourth module.

16. A system for processing pixel data in a graphics pipeline, comprising:

(a) a first module coupled to a rasterizer for calculating a plurality of equations using pixel data received from the rasterizer;

(b) a second module coupled to the rasterizer for receiving the pixel data therefrom and the first module for receiving the equations therefrom, the second module capable of executing floating point calculations and generating texture coordinates using the pixel data;

(c) a third module coupled to the second module, the third capable of looking up texture values using the texture coordinates;

(d) a fourth module coupled to the second module and the third module, the fourth module capable of converting the texture values to an appropriate floating point representation and generating color values using the equations; and (e) a fifth module coupled to the second module and the fourth module, the fifth module capable of combining the color values and the texture values;

(f) wherein a plurality of precisions are supported including full precision floating point, half precision floating point and integer.

17. A system for processing pixel data in a graphics pipeline, comprising:

(a) a first module coupled to a rasterizer for calculating a plurality of equations
using pixel data received from the rasterizer;

(b) a second module coupled to the rasterizer for receiving the pixel data therefrom and the first module for receiving the equations therefrom, the second module capable of executing floating point calculations and generating texture coordinates using the pixel data, wherein the floating point calculations include a no operation, texture fetch, derivative, move, multiply, addition, multiply and addition, reciprocal, reciprocal square root, three component dot product, four component dot product, distance vector, minimum, maximum, pack, unpack, set on less than, set on greater or equal than, floor, fraction, kill pixel, exponential base two (2), logarithm base two (2), and light coefficients;

(c) a third module coupled to the second module, the third capable of looking up texture values using the texture coordinates;

(d) a fourth module coupled to the second module and the third module, the fourth module capable of converting the texture values to an appropriate floating point representation and generating color values using the equations; and (e) a fifth module coupled to the second module and the fourth module, the fifth module capable of combining the color values and the texture values.

* * * * *